Figure 1:
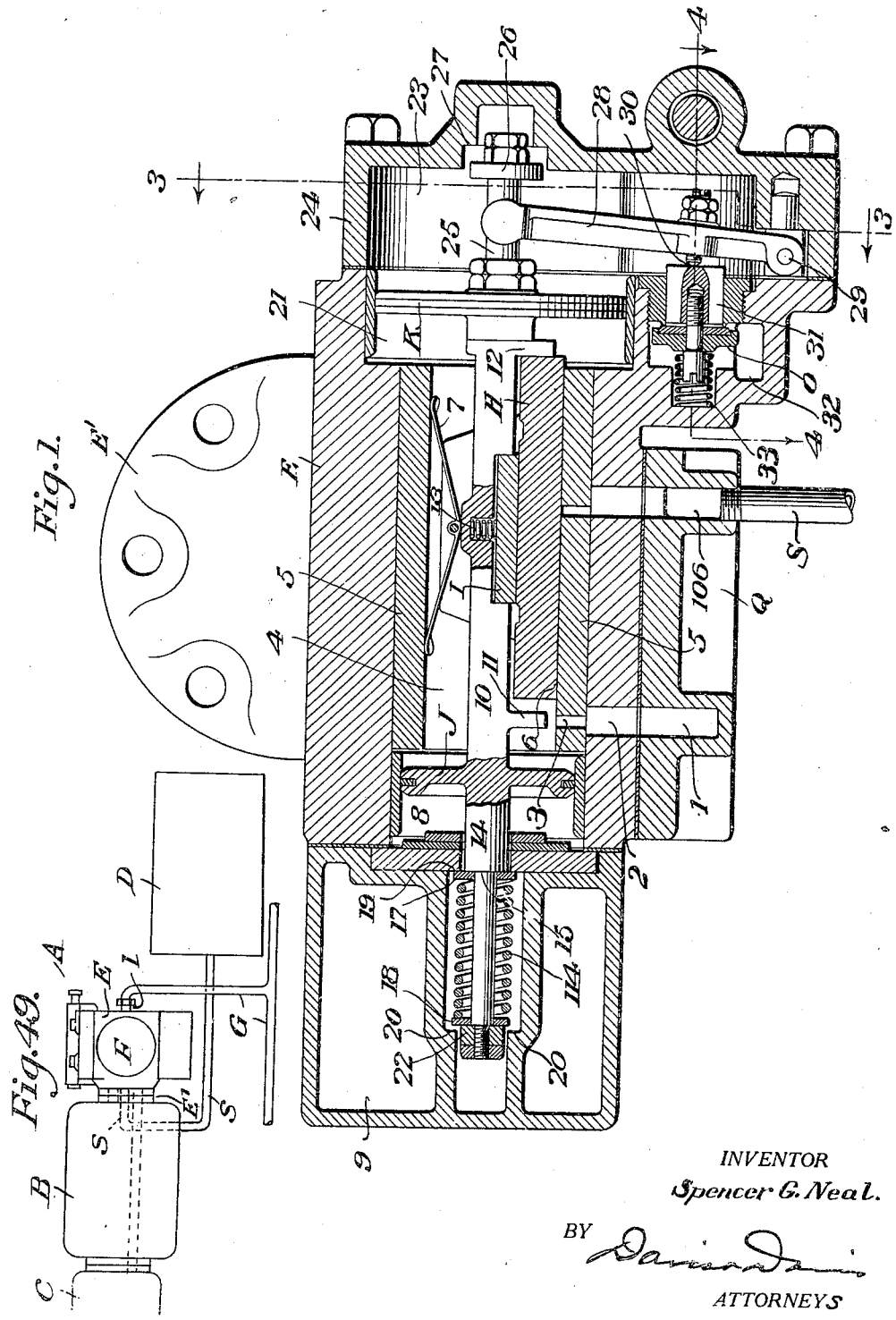

July 22, 1924.

S. G. NEAL

AIR BRAKE APPARATUS

Original Filed July 13, 1923    16 Sheets-Sheet 1

1,502,520

INVENTOR
Spencer G. Neal.
BY
ATTORNEYS

July 22, 1924.

S. G. NEAL

AIR BRAKE APPARATUS

Original Filed July 13, 1923   16 Sheets-Sheet 3

1,502,520

INVENTOR
Spencer G. Neal.

BY

ATTORNEYS

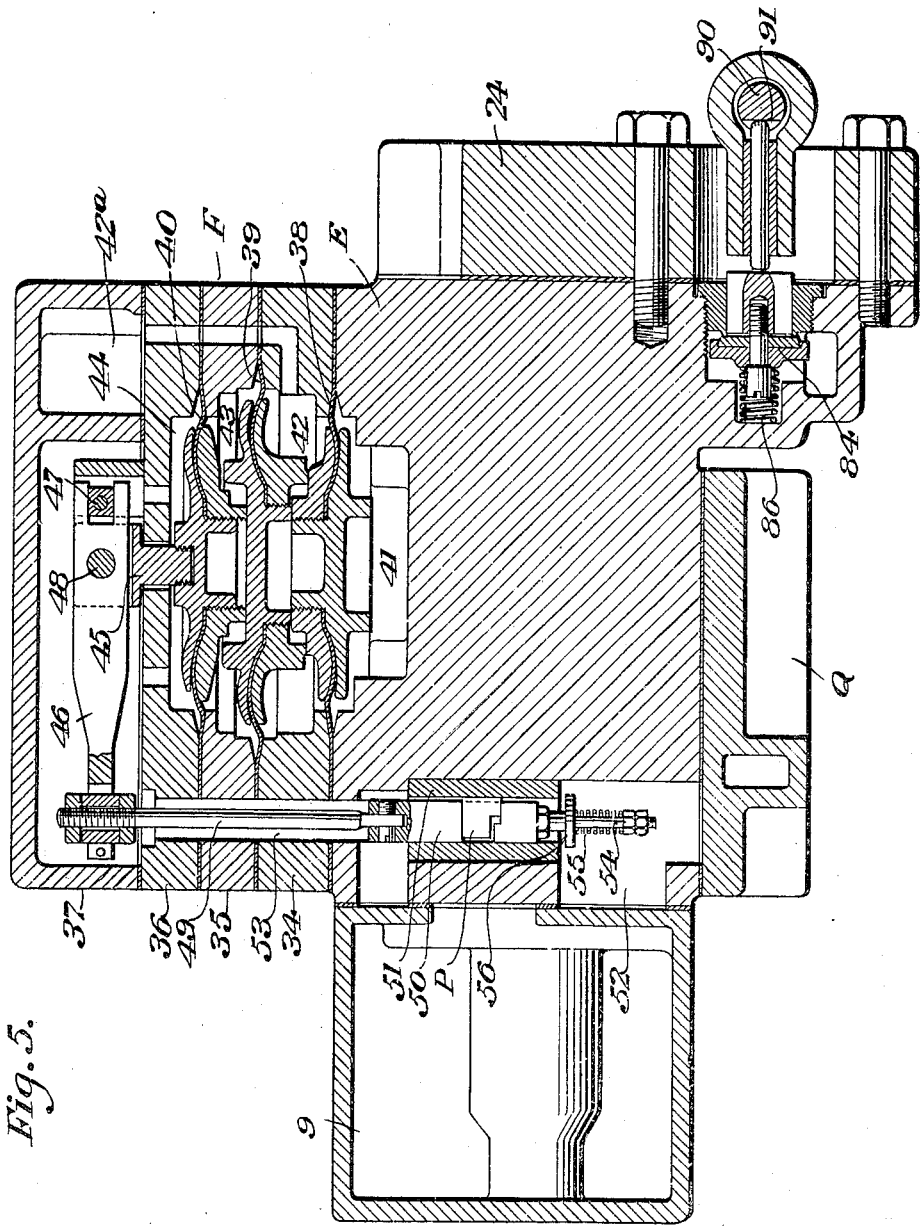

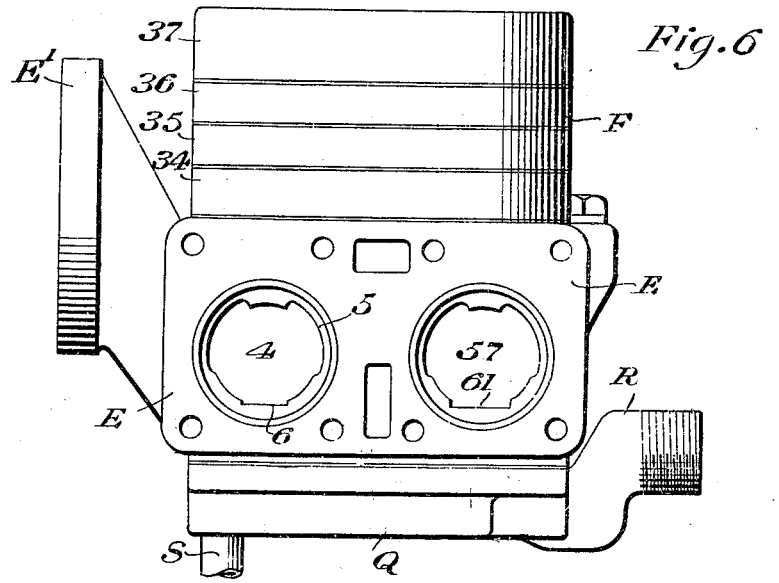
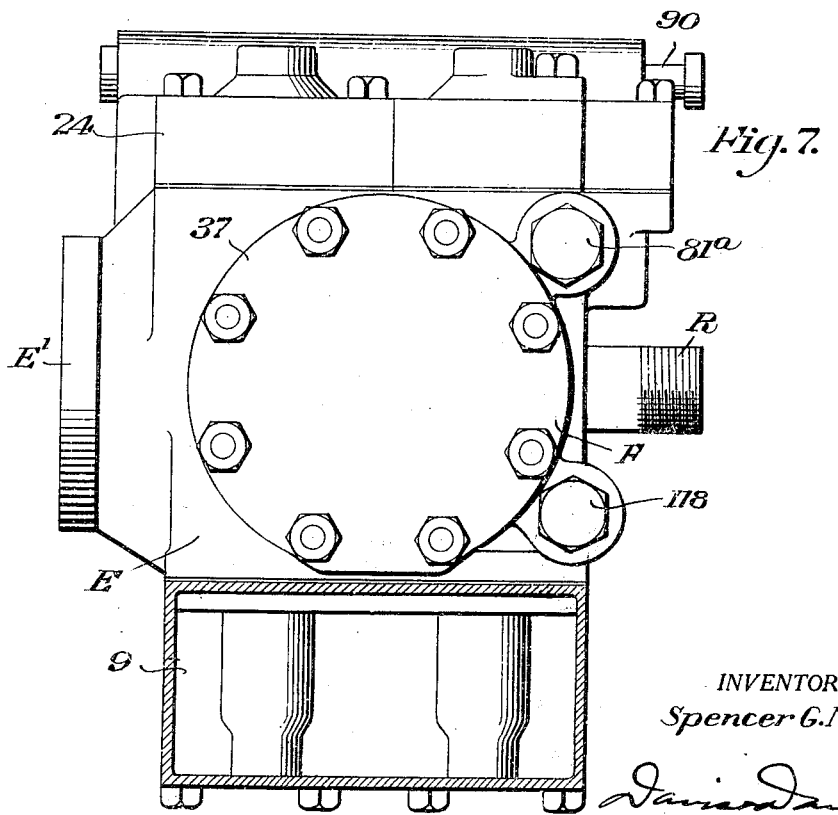

July 22, 1924.
S. G. NEAL
1,502,520
AIR BRAKE APPARATUS
Original Filed July 13, 1923   16 Sheets-Sheet 6
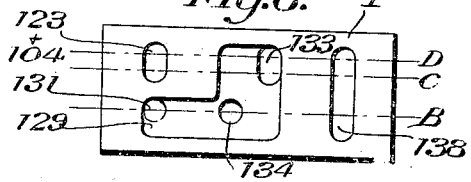
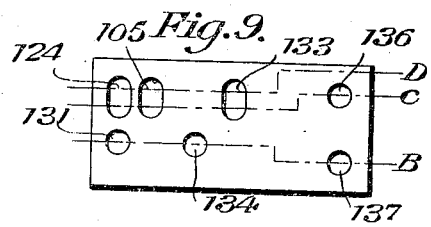
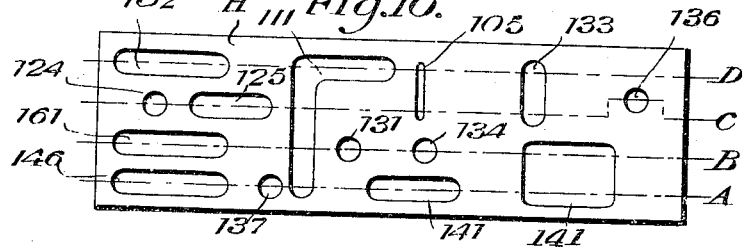
INVENTOR
Spencer G. Neal
BY
ATTORNEYS

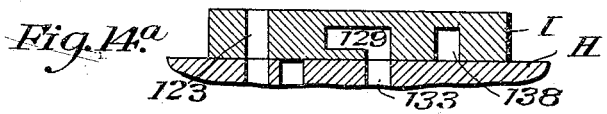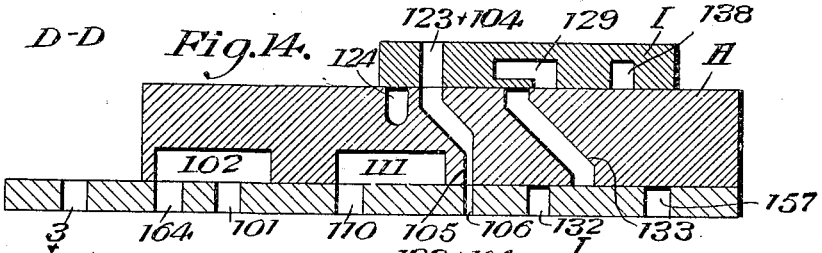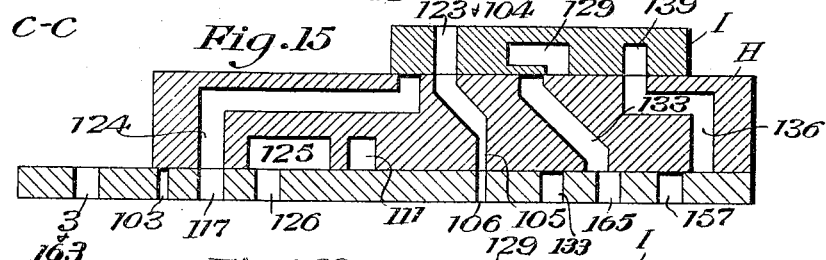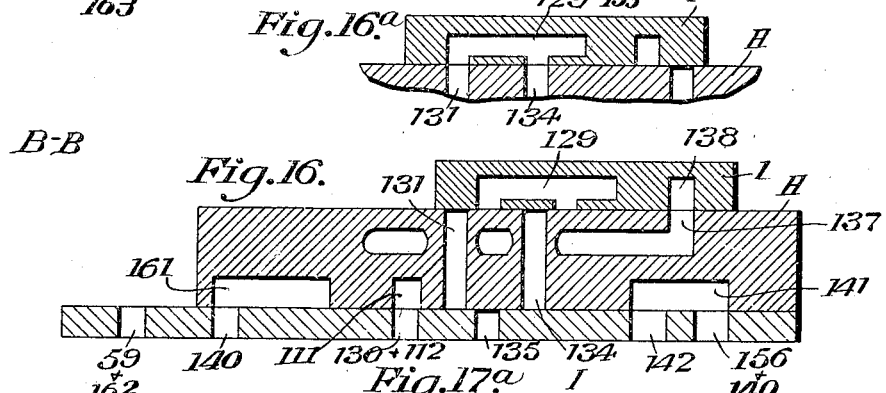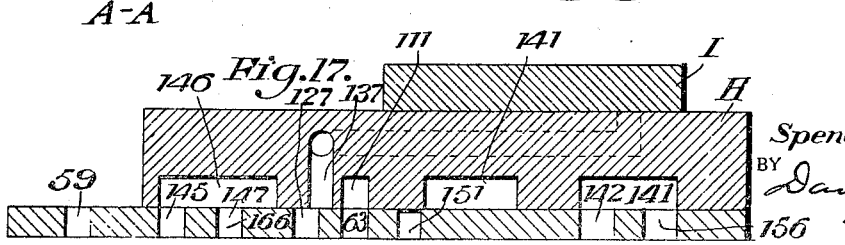

July 22, 1924.
S. G. NEAL
AIR BRAKE APPARATUS
Original Filed July 13, 1923   16 Sheets-Sheet 8
1,502,520
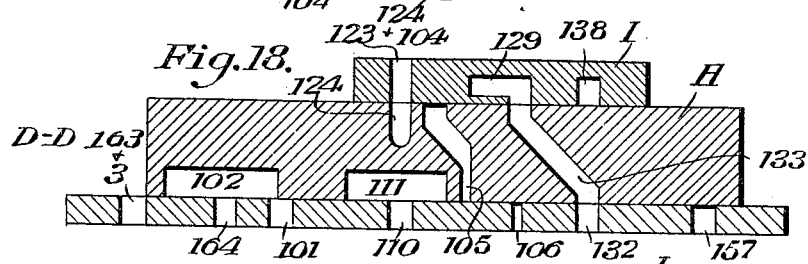
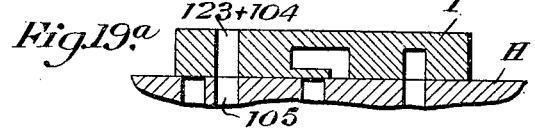
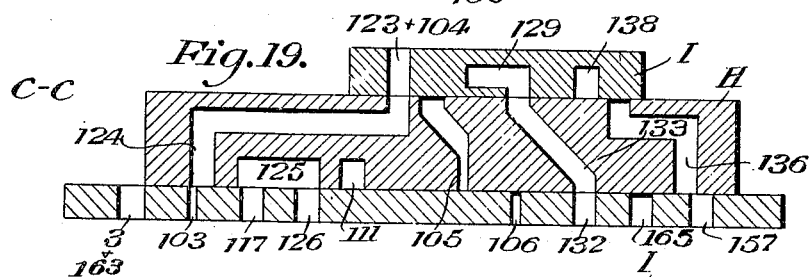
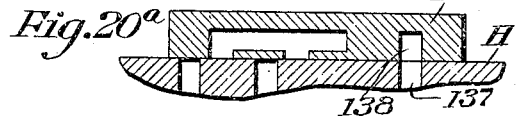
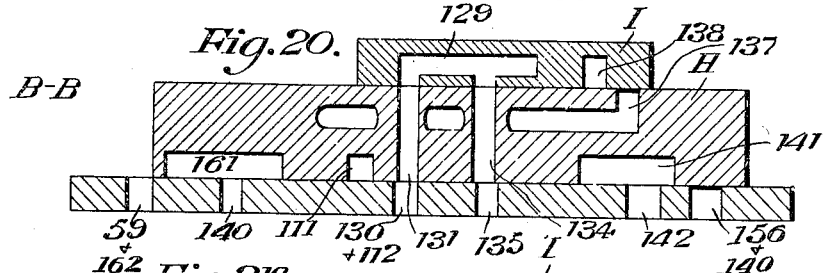
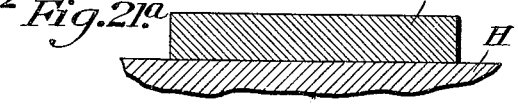
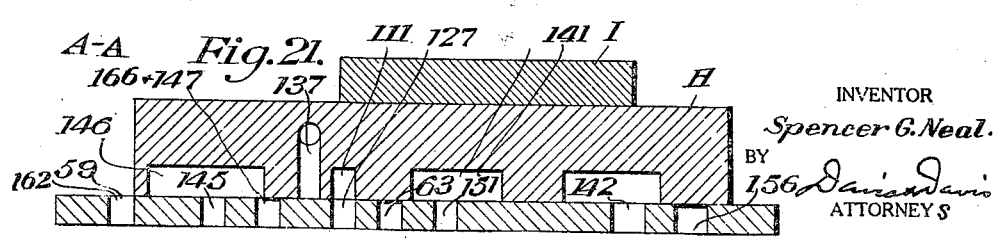
INVENTOR
Spencer G. Neal.
BY
ATTORNEYS July 22, 1924.
S. G. NEAL
1,502,520
AIR BRAKE APPARATUS
Original Filed July 13, 1923    16 Sheets-Sheet 9
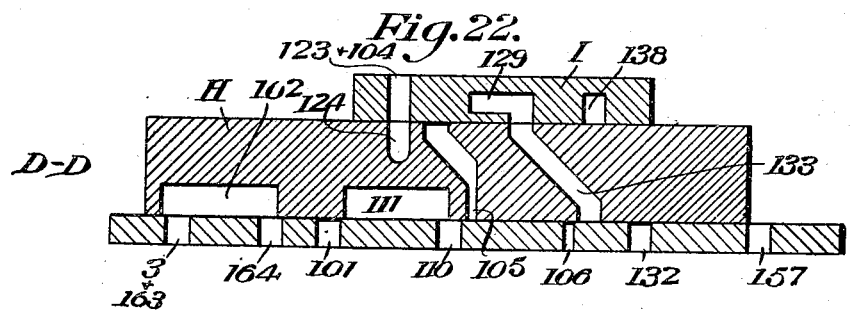
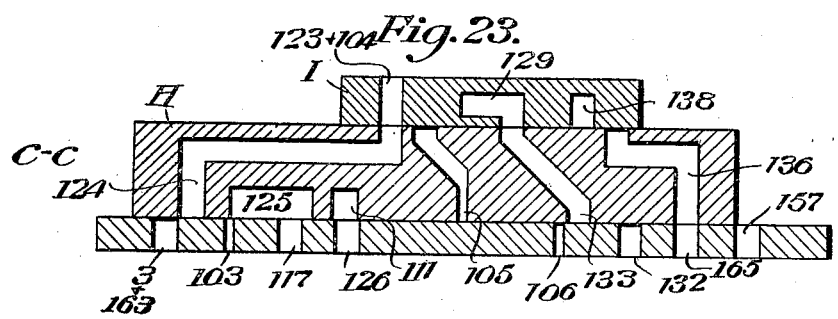
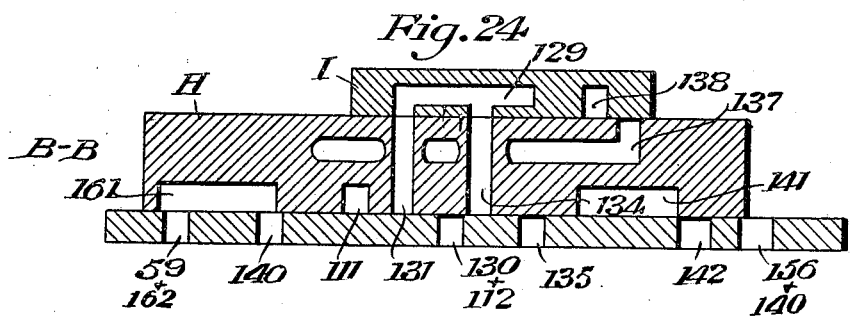
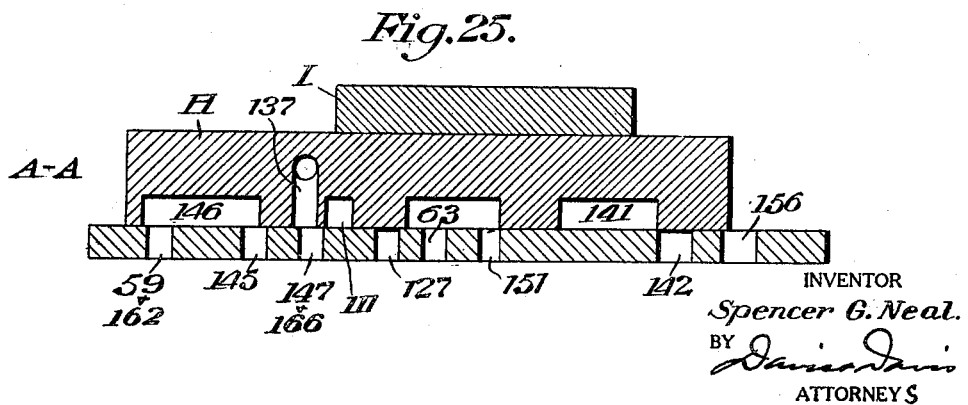
INVENTOR
Spencer G. Neal.
BY
ATTORNEYS

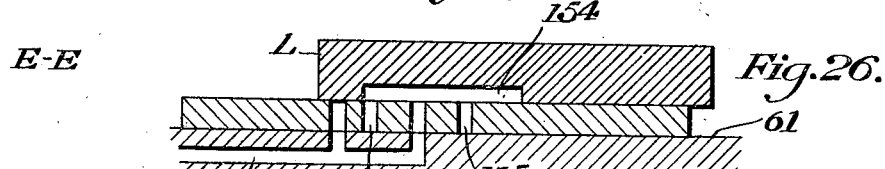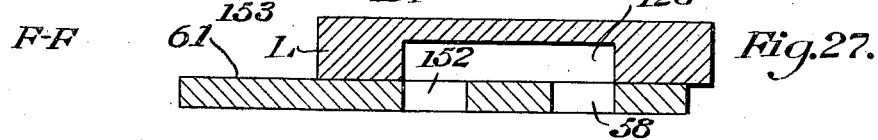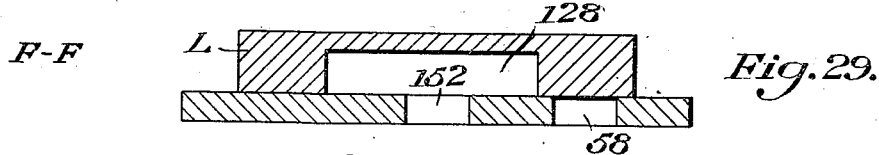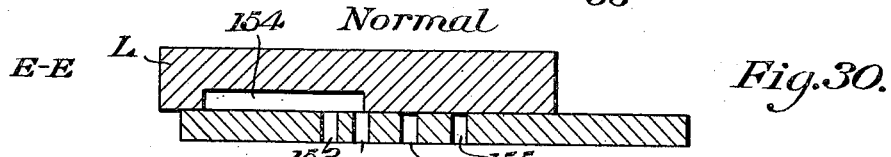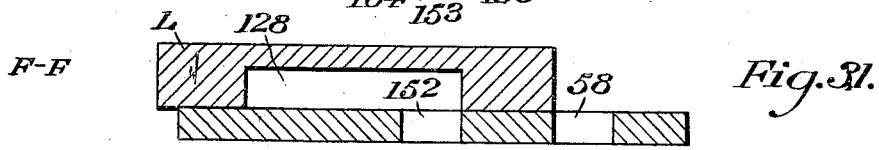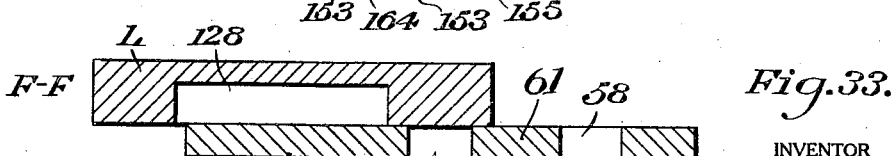

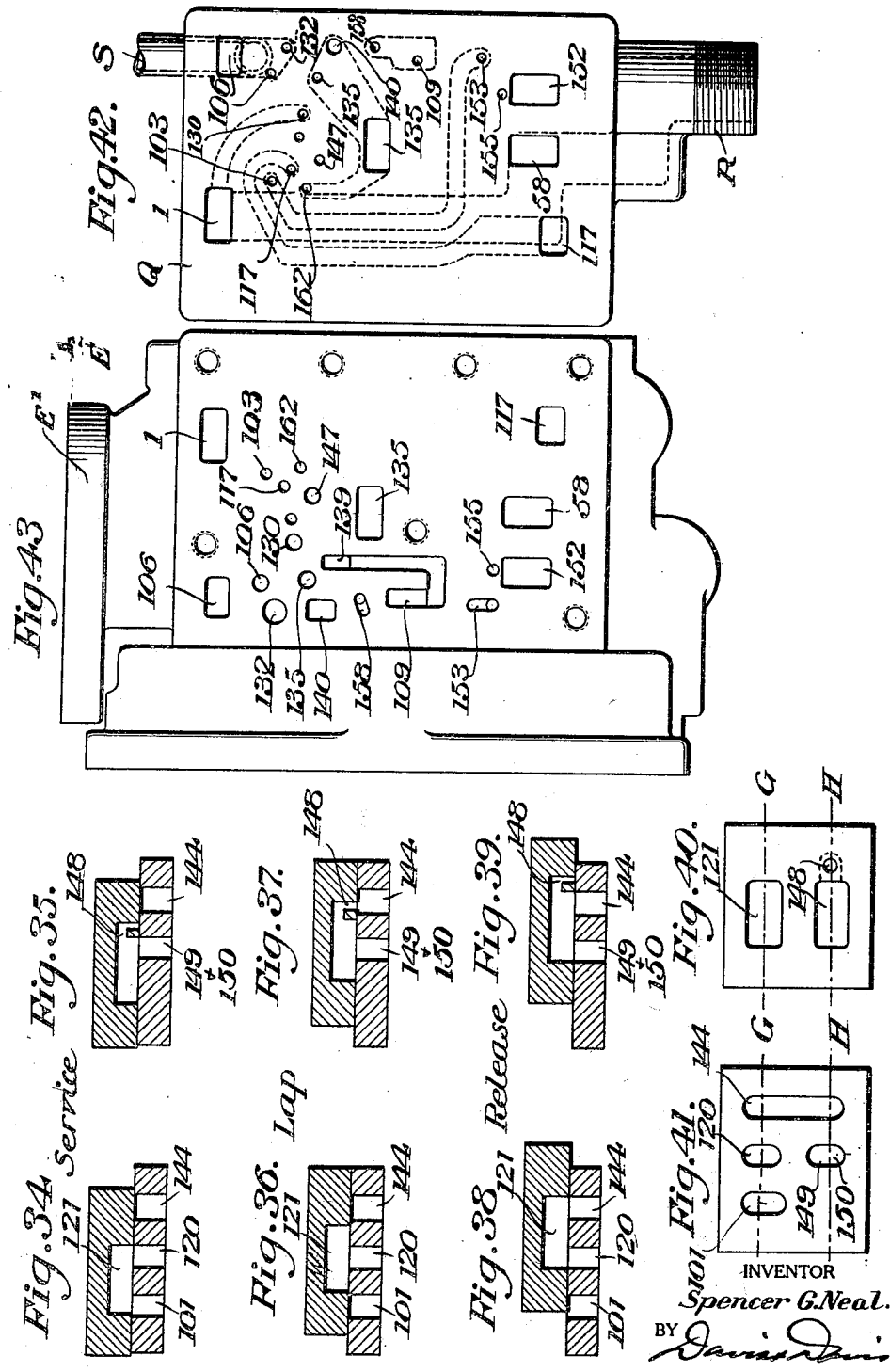

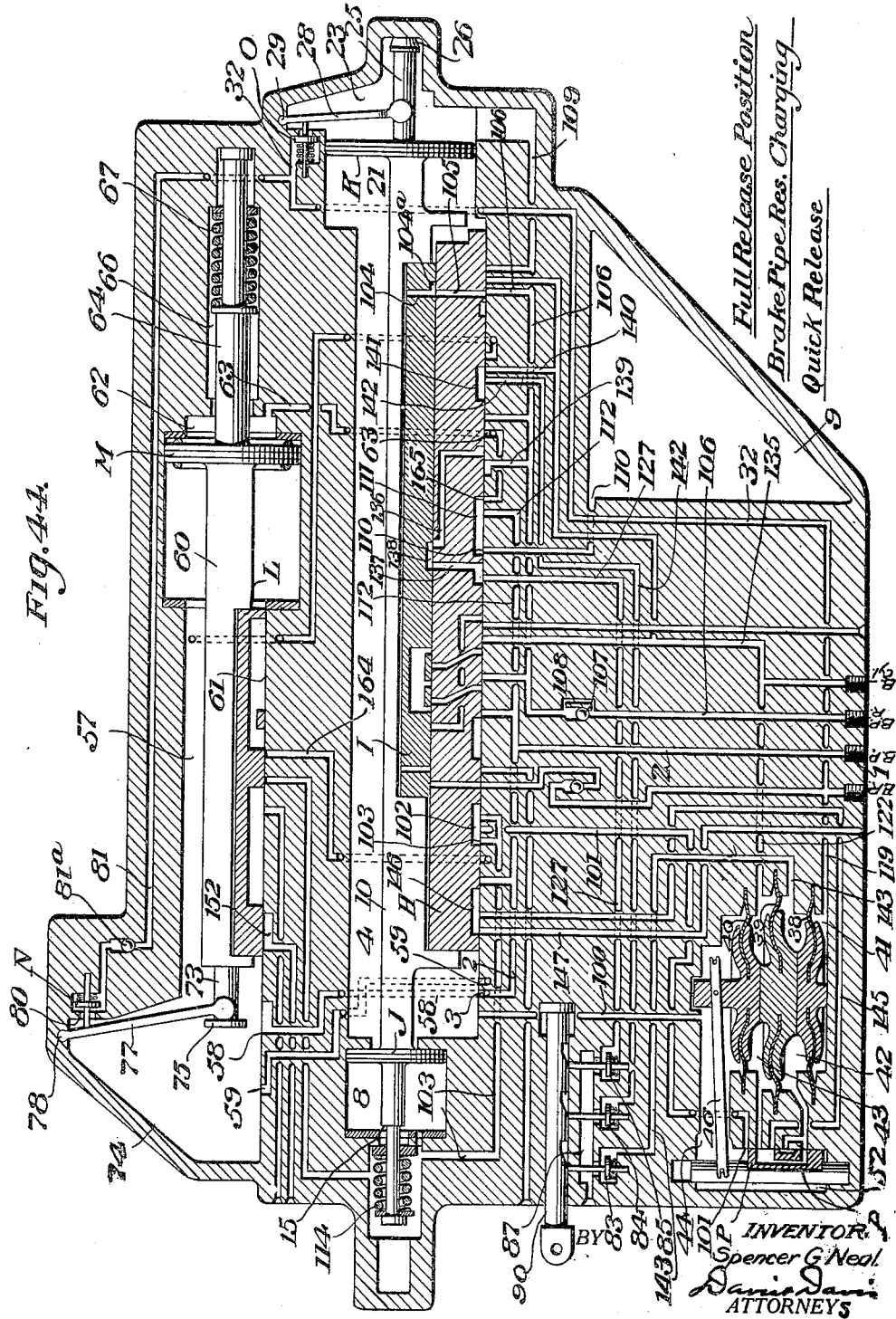

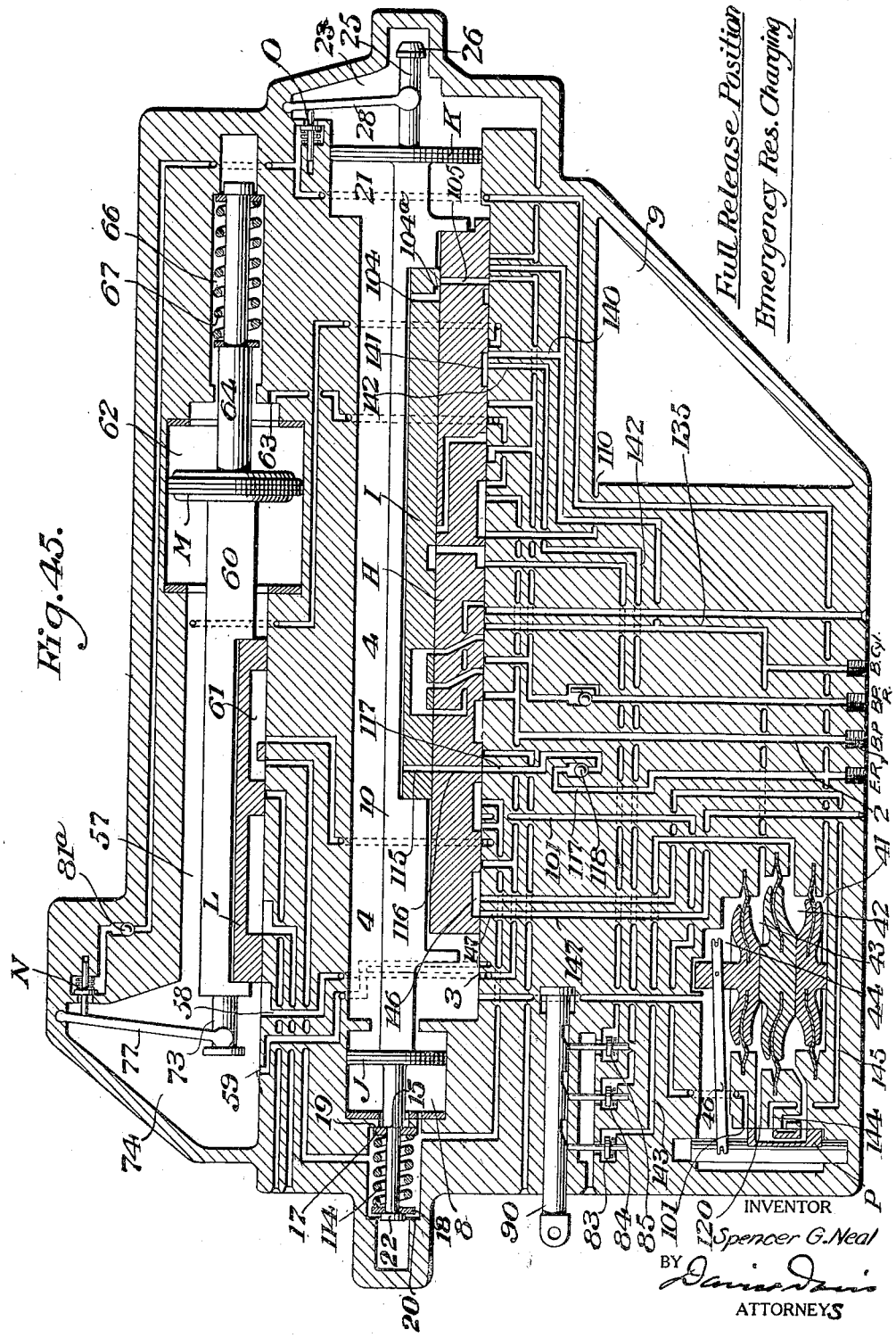

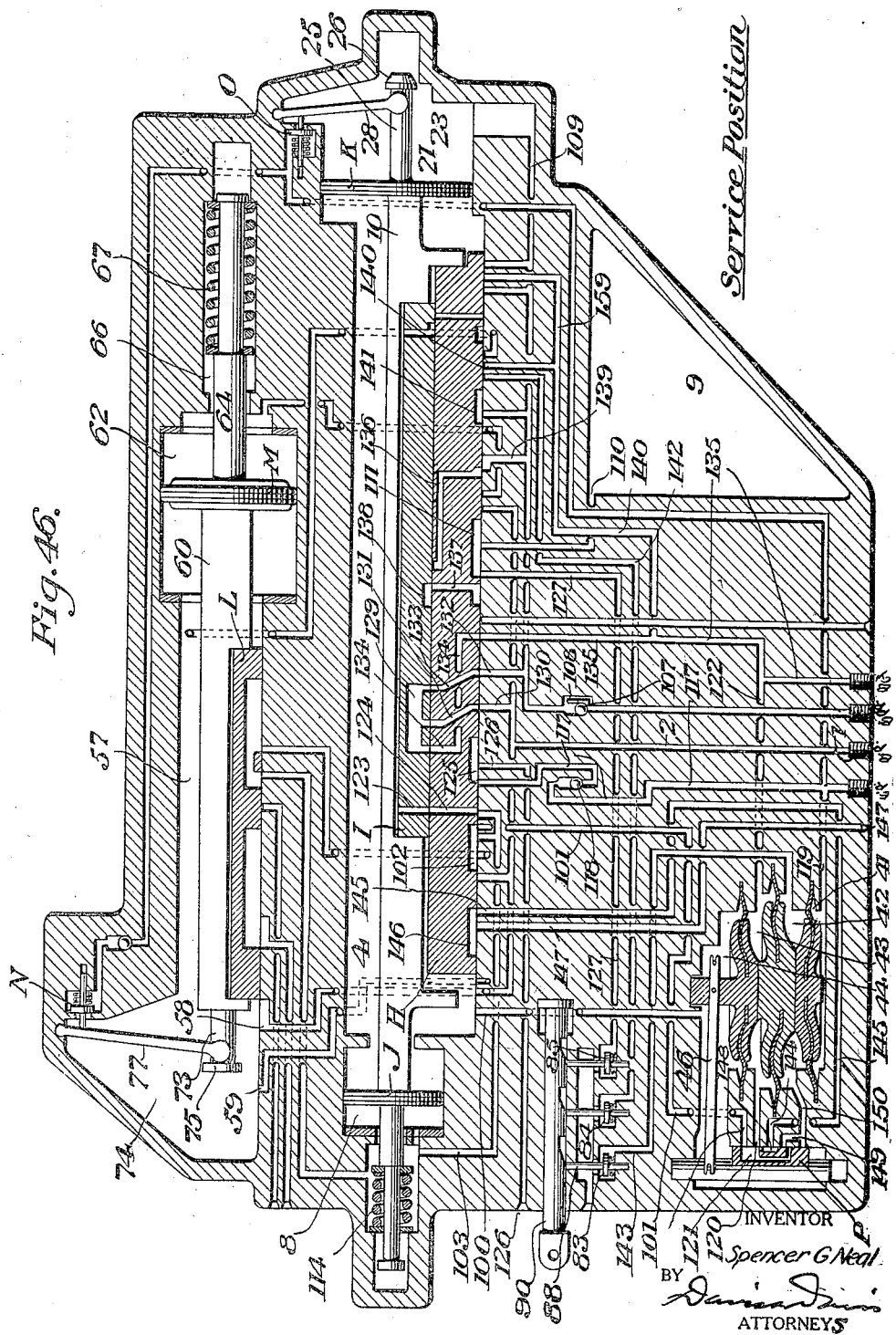

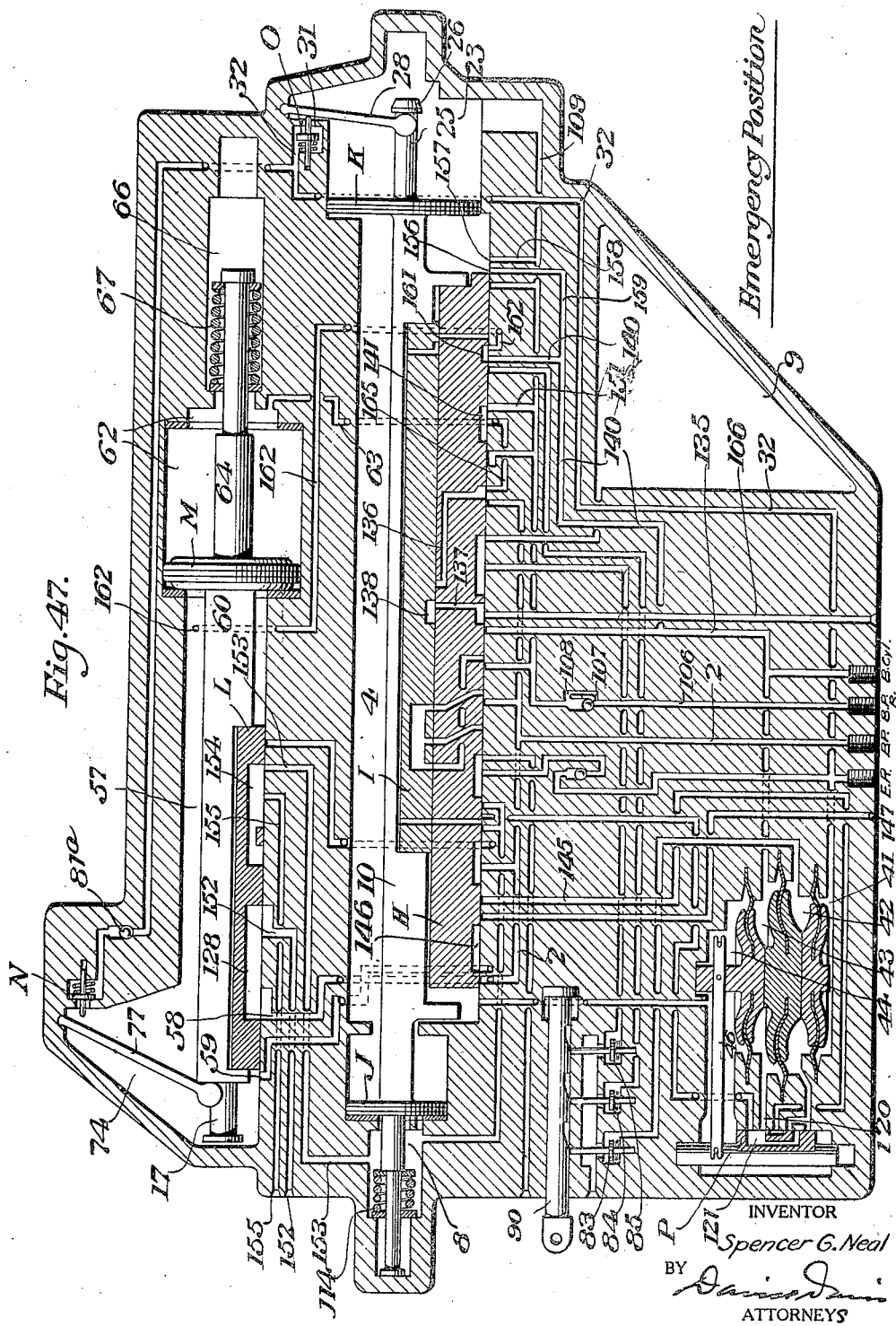

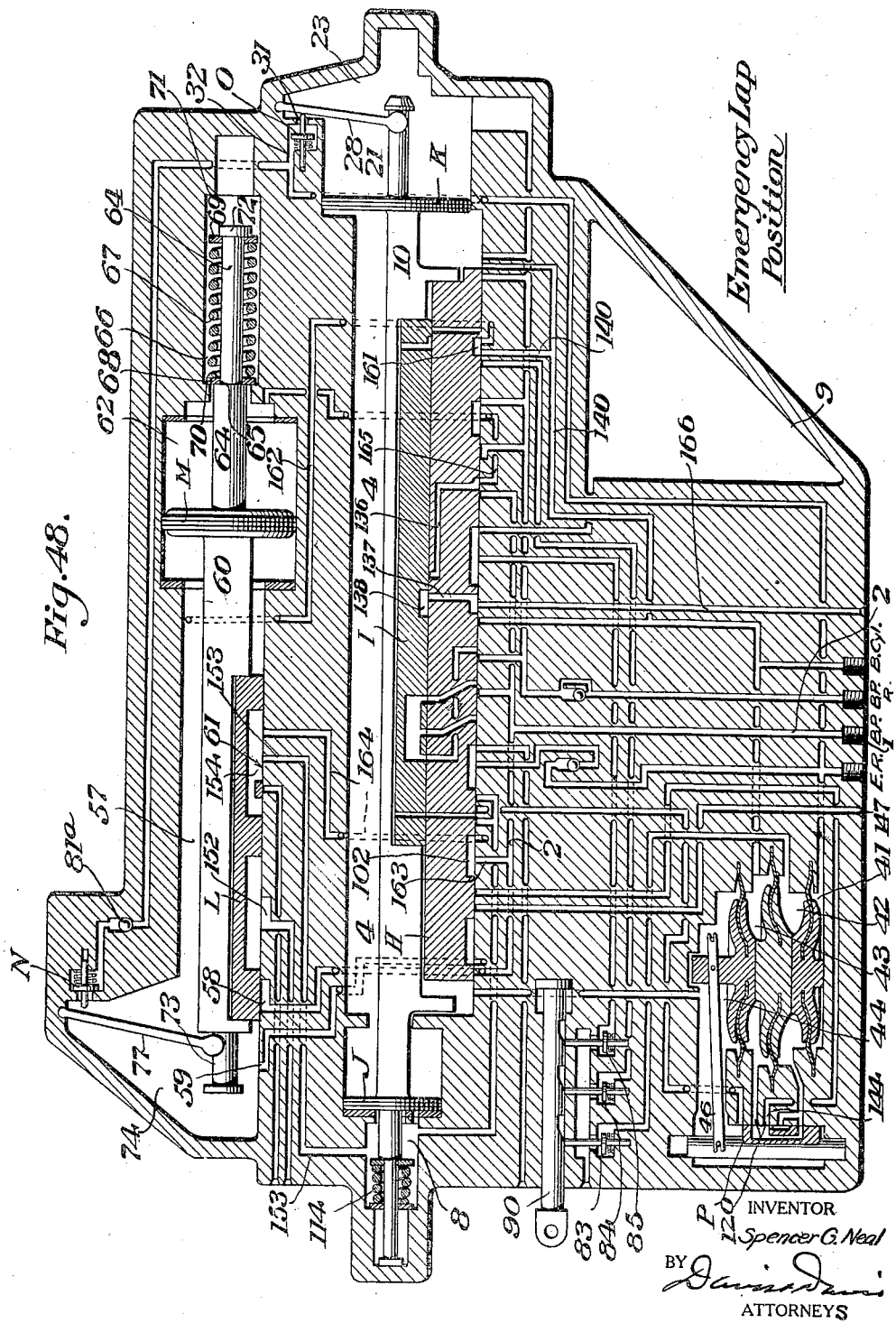

Patented July 22, 1924.

1,502,520

UNITED STATES PATENT OFFICE.

SPENCER G. NEAL, OF NEW YORK, N. Y., ASSIGNOR TO AUTOMATIC STRAIGHT AIR BRAKE COMPANY, OF WILMINGTON, DELAWARE, A CORPORATION OF DELAWARE.

AIR-BRAKE APPARATUS.

Application filed July 13, 1923, Serial No. 651,313. Renewed May 29, 1924.

*To all whom it may concern:*

Be it known that I, SPENCER G. NEAL, a citizen of the United States, and resident of the borough of Manhattan, in the city, county, and State of New York, have invented certain new and useful Improvements in Air-Brake Apparatus (Case No. 48), of which the following is a specification.

This invention relates to improvements in that type of air brake apparatus disclosed in patents numbered 1,411,368, dated April 4, 1922, and 1,418,961, dated June 6, 1922. These patents disclose an air brake apparatus in which brake pipe and brake pipe reservoir air is used for all service applications of the brakes, an emergency reservoir supplying air for emergency application of the brakes. In the apparatus disclosed in said patents the brake pipe volume is augmented by the brake pipe reservoir, air from said reservoir passing to the brake cylinder with air from the brake pipe during all service applications of the brakes, so that the brake pipe reservoir contains brake pipe air at substantially brake pipe pressure. It is a further characteristic of the apparatus disclosed in said patents that the brake cylinder pressure controls the movement of the triple valve to lap position so that the brake cylinder pressure will be built up to the desired degree without regard to the length of piston travel or brake cylinder leaks.

Triple valves for air brake apparatus in practical use are designed for use with brake cylinders and air reservoirs of certain sizes and such valves have a certain fixed capacity. It is necessary, therefore, to have triple valves of different sizes and of different constructions, with ports having the necessary capacities to adapt them for use with the different sizes of brake cylinders and air reservoirs. It follows from this that a triple valve designed and proportioned for use with a ten inch brake cylinder and an air reservoir designed to supply the necessary volume of air for such brake cylinder, is not adapted for use with a sixteen inch brake cylinder or an eighteen inch brake cylinder and an air reservoir of sufficient capacity to supply the necessary volume of air for said cylinders. It is therefore, the present commercial practice to furnish triple valves adapted for use with certain sizes of brake cylinders. This not only increases the cost and difficulties of the manufacture of air brake apparatus but requires the railroads to maintain a large supply of repair parts in order to take care of the repairs and replacement of parts in the various types and sizes of triple valve in actual service. The smaller sizes of brake cylinders are usually used on freight cars while the larger sizes are usually used on passenger cars. There are, of course, various sizes of brake cylinders used in freight service and various sizes of brake cylinders used in passenger service, dependent upon the weight of the car. It is therefore manifest that a railroad having a business of both freight and passenger service will necessarily have a large variety of triple valves in service.

One of the main objects of this invention is to provide a triple valve adapted for use with any and all sizes of brake cylinders and with any and all sizes of air reservoirs so that one standard form of triple valve may be used for all classes of service, both passenger and freight.

In order to provide a standard form of triple valve adapted for all kinds of service, both passenger and freight, it is necessary to provide means whereby certain ports and passages therein can be readily varied as to size in order to take care of the necessary air volumes being handled, it being obvious that the volume of air to be handled for an eighteen inch brake cylinder will greatly exceed the volume to be handled for a ten inch brake cylinder. It is another important object of this invention to provide means, readily accessible and secured to the exterior of the triple valve, whereby the size of certain ports and passages may be varied. This is accomplished in the present form of the invention by means of a restriction plate removably secured to the exterior of the triple valve. To adapt the triple valve for use with any desired size of brake cylinder and the necessary air reservoirs to be used therewith it is only necessary to secure to the exterior of the triple valve a restriction plate having ports and passages of the required size to handle the necessary air volume. The ports and passages to be restricted or varied as to capacity are led to a flange formed on one outer face of the triple valve casing so that they will register with ports and passages in the restriction plate. It is manifest, therefore, that by attaching a restriction plate to the said flange the volume of air controlled by said passages may be restricted or varied as desired in order to adapt the triple valve for the service for which it is intended. The ports and passages to be controlled by the restriction plate are those which lead from the brake pipe and to and from the brake cylinder and the air reservoirs. It will, of course, be understood that the ports and passages controlled by the various valves in the triple valve will be of sufficient capacity to handle the air volumes necessary for use in the largest brake cylinder in use. These ports and passages will control the operation of the triple valve and handle whatever volume of air passes through the ports of the restriction plate. The restriction plate is conspicuously marked so that the triple valve will bear an indication of the size of the brake cylinder with which the valve is adapted for use.

Another object of the invention is to make more positive and more sensitive the operation of the triple valve to service application position.

Another object of the invention is to make more positive the action of the triple valve in quick release operations.

There are other important objects and advantages of the invention which will be obvious to those skilled in the art, and which will appear hereinafter.

Figure 2:
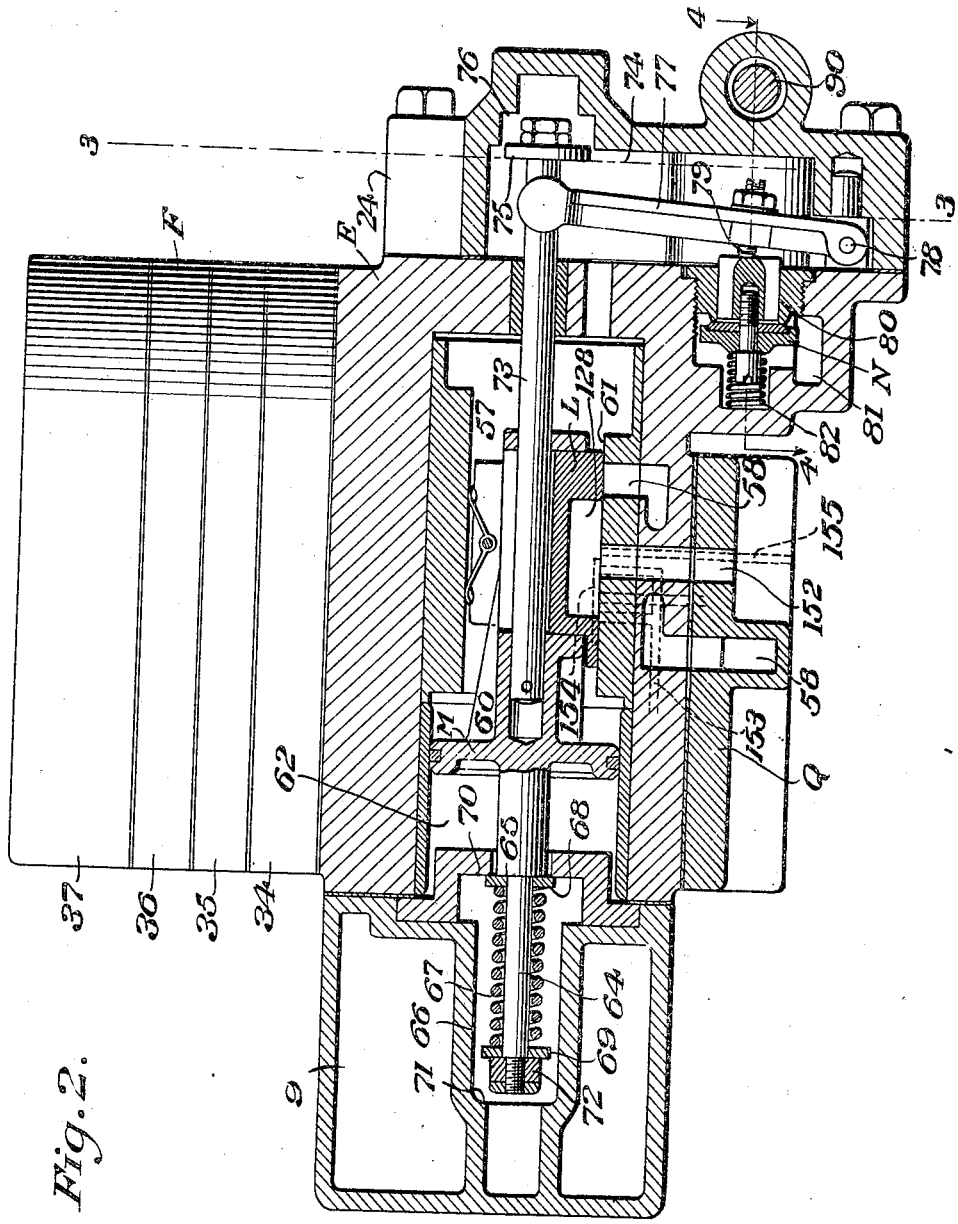
Figure 3:
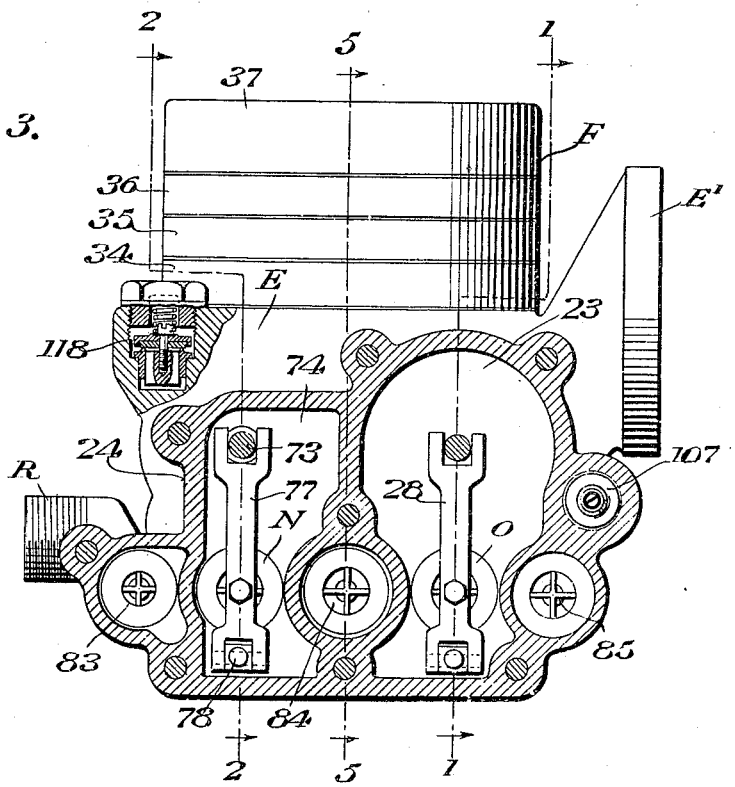
Figure 4:
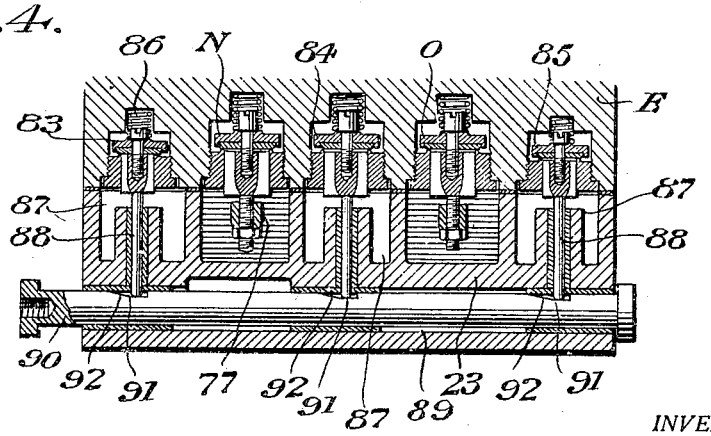

In the drawings, Fig. 1 is a vertical sectional view of the triple valve on the line 1—1 of Fig. 3;

Fig. 2 a vertical sectional view of the triple valve on the line 2—2 of Fig. 3;

Fig. 3 a vertical sectional view of the triple valve on the lines 3—3 of Figs. 1 and 2;

Fig. 4 a detail horizontal sectional view taken on the lines 4—4 of Figs. 1 and 2;

Fig. 5 a vertical sectional view of the triple valve taken on the line 5—5 of Fig. 3;

Fig. 6 a side elevation of the triple valve with one section thereof removed;

Fig. 7 a plan view of the triple valve, a portion thereof being shown in sectional view;

Fig. 8 a diagram of the graduating valve showing the ports as arranged on the face of the valve;

Fig. 9 a diagram showing the ports in the graduating valve seat on top of the main slide valve;

Fig. 10 a diagram of the main slide valve showing the ports in the face of the valve;

Fig. 11 a view of the main slide valve seat showing the ports therein;

Fig. 12 a diagram of the emergency vent valve showing the ports in the face thereof;

Fig. 13 a view of the emergency vent valve seat showing the ports therein;

Figs. 14, 15, 16 and 17 sectional views of the main and graduating valves taken on the lines D, C, B and A of Figs. 8 to 11 inclusive showing the valves in brake pipe reservoir charging position;

Figs. 14[a], 15[a], 16[a] and 17[a] sectional views, corresponding to Figs. 14 to 17 inclusive, showing the graduating valve in emergency reservoir charging position;

Figs. 18, 19, 20 and 21 sectional views of the main and graduating valves taken on the lines D, C, B and A of Figs. 8 to 11 inclusive, showing the valves in service application position;

Figs. 18[a], 19[a], 20[a] and 21[a] are sections corresponding to Figs. 18 to 21 inclusive showing the graduating valve in service lap position;

Figs. 22, 23, 24 and 25 sectional views of the main and graduating valves taken on the lines D, C, B and A of Figs. 8 to 11 inclusive showing the said valves in emergency position;

Figs. 26 and 27 sectional views of the emergency vent valve taken on the lines E—E and F—F of Figs. 12 and 13 showing the said valves in emergency position;

Figs. 28 and 29 sectional views similar to Figs. 26 and 27 showing the valve in emergency lap position;

Figs. 30 and 31 sectional views similar to Figs. 26 and 27 showing the valve in normal position;

Figs. 32 and 33 sectional views similar to Figs. 26 and 27 showing the valve in quick release position;

Figs. 34 and 35 sectional views of the pilot valve and its seat taken on the lines G—G and H—H of Figs. 40 and 41 showing the pilot valve in service position;

Figs. 36 and 37 sectional views similar to Figs. 34 and 35 showing the pilot valve in lap position;

Figs. 38 and 39 sectional views similar to Figs. 34 and 35 showing the pilot valve in release position;

Fig. 40 a detail view of the face of the pilot valve;

Fig. 41 a detail view of the pilot valve seat showing the ports therein;

Fig. 42 a detail view of the restriction plate Q;

Fig. 43 a detail view showing the flange to which the restriction plate is secured;

Fig. 44 a diagrammatic view of the entire triple valve showing the ports and passages and valves diagrammatically arranged with the parts in full release and brake pipe reservoir charging position with the release governing valves in quick release position;

Fig. 45 a view similar to Fig. 44 with the parts in full release and emergency reservoir charging position;

Fig. 46 a view similar to Fig. 44 showing the parts in service application position;

Fig. 47 a view similar to Fig. 44 showing the parts in emergency application position;

Fig. 48 a view similar to Fig. 44 showing the parts in emergency lap position; and Fig. 49 a diagrammatic view showing the triple valve connected to the brake pipe, brake pipe reservoir, emergency reservoir and brake cylinder.

Referring to various parts by reference characters A designates the triple valve; B the emergency reservoir; C the brake cylinder; and D the brake pipe reservoir.

The triple valve comprises a main body portion E and a controller section F. The main body portion contains the main and graduating valves; the service piston; the release and emergency piston; the emergency vent valve; and the emergency vent valve piston. The controller section contains the means for operating the pilot valve.

G designates the brake pipe; H the main or service slide valve; I the graduating valve; J the service piston; K the release and emergency piston; L the emergency vent valve; M the emergency vent valve piston, which piston also operates the quick release valve; N the quick release valve, which controls the discharge of emergency reservoir air to the brake pipe for a quick serial release of the brakes; and O the emergency reservoir valve which controls the discharge of emergency reservoir air to the brake cylinder for an emergency application of the brakes. P designates the pilot valve which controls the operation of the main slide valve, the service and service lap position and also controls the release of brake cylinder pressure when operating in graduated release.

In order to simplify the description, the structural arrangement of the various parts will be first described, and then the various ports, passages and valves and their functions and movements will be described in detail in connection with the several valve operations. In the drawings illustrating the general construction and arrangement of the triple valve, the ports and passages have been to a large extent omitted in order to simplify the drawings and prevent confusion. The ports and passages are illustrated diagrammatically in Figs. 44 to 48 inclusive and have been illustrated correctly in Figs. 8 to 41 inclusive. In view of the full illustrations of the ports and passages in the detail views it is thought unnecessary to attempt to illustrate them in the views showing the construction and arrangement of the parts of the triple valve.

The main body part E of the triple valve is provided with a flange E' by means of which the triple valve may be bolted to the emergency reservoir B in the usual manner. The ports which lead to the emergency reservoir and to the brake cylinder extend through this flange, the brake cylinder port connecting with a pipe running through the emergency reservoir to the brake cylinder in the usual manner, as indicated by dotted lines in Fig. 49. In the main body portion of the triple valve, and extending transversely thereof side by side are the main slide valve chamber and the emergency vent valve chamber. Secured to the bottom of the main section E of the triple valve body is a restriction plate Q in which are formed certain ports and passages hereinafter fully described. The restriction plate carries the brake pipe connection R through which brake pipe air is led to the brake pipe port of the triple valve body; and said plate is also provided with a connection S to which the brake pipe reservoir is connected, the connection S leading through the restriction plate to the brake pipe reservoir port of the triple valve body.

The main body part E of the triple valve is provided with a brake pipe connection 1 which is in direct communication through a passage 2 with a port 3 in the main slide valve seat, thereby placing the brake pipe in direct communication with the main brake pipe chamber 4, said chamber also constituting the main slide valve chamber. In the chamber 4 is arranged a bushing 5 in which is formed the main slide valve seat 6, the main slide valve H operating on said seat and being held in position thereon by means of a spring 7 carried by the main slide valve and bearing on the inner surface of the bushing. In the main body portion E is also formed a supplemental brake pipe chamber 8 at one end of the main brake pipe chamber 4. The chamber 8 is cylindrical and is provided with a bushing in which reciprocates the service piston J, said piston serving as a movable abutment separating the main brake pipe chamber from the supplemental brake pipe chamber. Connected rigidly to the service piston J and extending centrally through the main brake pipe chamber is a valve stem 10 which carries two abutments 11 and 12 which are adapted to engage the ends of the main slide valve. The distance between said abutments is greater than the length of the main slide valve so that the valve stem and the service piston may have a certain limited movement independently of the main valve. The valve stem 10 is cut out to receive the graduating valve I, said valve being fitted to move with the stem. The graduating valve operates on the upper surface of the main slide valve and is held yieldingly in engagement therewith by means of a light coil spring 13 seated in the valve stem and forcing the graduating valve into engagement with the main slide valve. The service piston J is provided with a rigid stem 14 which extends outwardly through the supplemental brake pipe chamber 8, its outer end being reduced in diameter to form a shoulder or abutment 15. The reduced outer end of this stem extends into a cavity formed within a volume chamber 9 secured to the side of the main body part of the triple valve, said cavity forming a part of the supplemental brake pipe chamber 8. The purpose of the volume chamber will be hereinafter described. Surrounding the reduced portion of the stem 14 is a coil spring 114, said spring serving to lap the graduating valve, as hereinafter described. The spring 114 is confined between two collars 17 and 18 loosely arranged on the said stem. The collar 17 normally rests against an abutment 19 and is adapted to be engaged and moved away from said abutment by the shoulder 15 when the main slide valve is moved into service position. The collar 18 is adapted to engage an abutment 20 formed within the cavity of the volume chamber; and on the end of the stem is secured a rigid stop 22 which is adapted to engage the collar 18. The distance between the shoulder 15 and the face of the stop 22 is somewhat less than the distance between the abutments 19 and 20 so that the stem 14 and the parts connected thereto may have a limited independent movement free of the spring pressure. The purpose of this free movement will be hereinafter described.

The main body part E is provided with a large piston chamber 21 which is in direct and open communication with the main brake pipe chamber 4 at the opposite end thereof from the chamber 8. In this piston chamber is arranged the release and emergency piston K which is considerably larger in diameter than the service piston J, said two pistons being axially in line with each other and rigidly connected to the valve stem 10. Secured to the side of the main section of the triple valve body is a casing 24 in which is formed a number of chambers and compartments adapted to receive valves and valve operating levers, as will be fully hereinafter described. In said casing is formed an emergency valve chamber 23 which registers with the piston chamber 21. The piston K forms a movable abutment separating the chamber 23 from the main brake pipe chamber 4 so that the air pressure in said chamber 4 will operate on one side of said piston and brake pipe reservoir pressure in chamber 23 will operate on the other side of the said piston. That side of the piston K which is exposed to the air pressure in the main brake pipe chamber 4 might be termed the release side of the piston and that side which is exposed to the air pressure in the emergency valve chamber might be termed the emergency side of said piston. The release and emergency piston K is larger than the service piston J so that an increase in brake pipe pressure in the main brake pipe chamber 4 will move the piston K toward the right hand as viewed in Figs. 1, 44 to 48 inclusive and carry the main slide valve and the graduating valve to release and charging position, as will be more fully hereinafter described.

The release and emergency piston K is provided with a central operating stem 25 which extends outwardly through the emergency valve chamber 23. The outer end of this stem is provided with a stop collar 26 which is adapted to engage a stop shoulder 27 on the casing 24 to limit the movement of the main slide valve to release and charging position. In the emergency valve chamber is arranged an emergency lever 28, one end of which is pivoted at 29 and the other end of which is slidably connected to the stem 25. The lever 28 carries a valve operating pin 30 which is adapted to engage the projecting end of the emergency reservoir valve O. The valve O is a check valve mounted in a bushing in the section E of the triple valve, and controls a port 31 which is in connection with a passage 32, said valve being held yieldingly to its seat by a spring 33. When the piston K is moved inwardly to emergency position the lever 28 will force the emergency valve O from its seat and thereby place passage 32 in communication with the emergency valve chamber 23. Passage 32 is in direct communication with the emergency reservoir, as will be hereinafter described.

The controller section F is mounted on the upper side of the main valve body section E, as viewed in the drawings, and consists of rings 34 and 35, plate 36 and cap plate 37, all of said parts being bolted together and to the body part E. Between these rings and the main body part of the valve are arranged diaphragms 38, 39 and 40, said diaphragms forming chambers 41, 42, 43 and 44. The diaphragm structure, including the central members supporting the diaphragms, is constructed substantially as shown and described in the aforesaid Patents #1,411,386 and 1,418,961, and it is thought unnecessary to particularly describe that construction herein. Chamber 41 constitutes an emergency reservoir chamber and is in free communication with the emergency reservoir. Chamber 42 constitutes a retention chamber which in graduated release operations receives and retains, for a limited period, a portion of the brake cylinder pressure, as will be more fully hereinafter described. Chamber 42ᵃ is merely an enlargement of chamber 42. In quick release operations this retention chamber is opened directly to atmosphere. Chamber 43 is the brake cylinder pressure controlling chamber and is in direct communication with the brake cylinder. Chamber 44 is the actuating chamber and is in communication with the main brake pipe chamber 4 and through said chamber with the brake pipe, said communication being open to the main brake pipe chamber at all times. The cap 37 forms an extension of the actuating chamber and is in open and direct communication with said chamber 44 through openings in the plate 36. The central supporting member of the actuating diaphragm 40 is provided with a shouldered stem 45 which extends through a central opening in the plate 36. The shoulder on said stem is adapted to contact with the upper surface of the plate 36 and the upper supporting member of diaphragm 40 is adapted to contact with the lower surface of plate 36 and thereby serve as means for limiting the travel of the diaphragm 40. As all of the diaphragms move together, or substantially so, the said above mentioned means will serve as a means for limiting the extent of travel of all the diaphragms. Pivotally mounted in the extension of the actuating chamber formed by the cap 37 is a pilot valve lever 46, said lever being mounted at one end on a pivot 47 and being connected by a pin 48 to the upper end of the shouldered stem 45. The free end of the pilot valve lever is connected by a rod 49 to a guide 50 which carries a pilot valve P. The guide 50 operates in a bushing 51 mounted in a chamber 52, and said chamber is in open communication with the actuating chamber through the aperture 53, the operating rod 49 extending through said aperture as clearly shown in Fig. 5 of the drawings. It is manifest that when the diaphragm structure moves the pilot valve will be moved on its seat. The controlling diaphragm 39, which is subject to brake cylinder pressure in the brake cylinder pressure control chamber 43, is larger in diameter than the actuating diaphragm. This latter diaphragm and the emergency diaphragm are of equal diameters. The areas of the diaphragms 39 and 40 are so proportioned that it is necessary for the brake cylinder pressure to be built up in the controlling chamber 43 to approximately two and one half times the brake pipe reduction in chamber 44 before the combined pressures of chambers 43 and 44 will overcome the undisturbed emergency reservoir pressure in chamber 41. When this takes place the pilot valve will be moved to lap position and the building up of brake cylinder pressure will be stopped, as will be fully hereinafter described. The guide 50 is provided with a shouldered stem 54 and around the reduced part of said stem is arranged a lap spring 55. A loose collar 56 is held against the shoulder of the stem by said spring and this collar is adapted to engage the end of the bushing 51 when the pilot valve is moved to service position. The movement of the pilot valve to service position will result in a slight compression of the lap spring so that when the pressure in the chambers 43 and 44 plus the tension of the spring 55 are sufficient to overcome the emergency reservoir pressure in chamber 41 the pilot valve will be moved to lap position. When the lap position is reached the force of the spring 55 is removed entirely from the pilot valve and said valve will remain in lap position because the pressure in chambers 43 and 44 without the assistance of the spring 55 will not be sufficient to continue the movement of the valve. In moving from release to lap position the spring 55 will serve as a means to stop the valve in lap position because the force of said spring will be added to the pressure in chambers 43 and 44 and will arrest the valve in lap position. The pilot valve P may be held to its seat in any suitable manner.

In the main body part E of the triple valve is formed the emergency vent valve chamber 57, said chamber being arranged parallel with and alongside of the main brake pipe chamber 4, as shown clearly in Fig. 6 of the drawings. This chamber is in direct communication with the main brake pipe chamber 4 and with the brake pipe through port and passage 58. This chamber is also in direct communication with chamber 4 through port and passage 59, as will be more fully hereinafter described. At one end of the chamber 57 is arranged a cylindrical bushing in which operates vent valve piston M. This piston is provided with a rigid inwardly extending valve stem 60, said stem carrying abutments between which the emergency vent valve L is held so that the said valve will move with the piston. The vent valve L operates on a valve seat 61 formed in a bushing mounted in the chamber 57; and said valve is held yieldingly on its seat by a spring in the usual manner. The piston M constitutes a movable abutment which separates the emergency vent valve chamber from a quick release chamber 62, said chamber being on the outer side of the piston M while the vent valve chamber is on the inner side thereof. The piston M will reciprocate in response to variations in pressures in these two chambers. The quick release chamber 62 is in communication with a port in the main slide valve seat through port and passage 63 and said port and passage is placed in communication with the volume chamber through the operation of the main slide valve, as will be hereinafter described. The emergency vent valve L is provided with grooves and ports and controls the venting of the brake pipe, and the supplemental brake pipe chamber to atmosphere when the triple valve moves to emergency application position, as will be fully hereinafter described. The emergency vent valve piston M is provided with a rigid stem 64 which extends outwardly through the quick release chamber 62, its outer end being reduced in diameter to form a shoulder or abutment 65. The reduced outer end of this stem extends into a cavity 66 formed within the volume chamber 9, said cavity forming a part of the quick release chamber. Surrounding the reduced portion of the stem 64 is a coil spring 67, said spring serving to lap the emergency vent valve, as hereinafter described. The spring 67 is confined between two collars 68 and 69 loosely arranged on said stem. The collar 68 is adapted to engage an abutment 70 and is adapted to be engaged and moved away from said abutment by the shoulder 65. The collar 69 is adapted to engage an abutment 71 formed within the cavity 66; and on the end of the stem is secured a rigid stop 72 which is adapted to engage the collar 69 and move it away from the abutment 71. The distance between the shoulder 65 and the face of the stop 72 is somewhat less than the distance between the abutments 70 and 71 so that the stem 64 and the piston M and the parts connected thereto may have a limited independent movement free of the spring pressure.

The emergency vent valve piston M is provided with a central operating stem 73 which extends through the emergency vent valve chamber and into a cavity 74 formed in the casing 24, said cavity constituting a part of the emergency vent valve chamber and being in open and direct communication therewith. The outer end of this stem 73 is provided with a stop collar 75 which is adapted to engage a stop shoulder 76 on casing 24 to limit the movement of the emergency vent valve in quick release operations, as will be more fully hereinafter described. In the cavity 74 is arranged a quick release lever 77, one end of which is pivoted at 78 in the casing 24, its other end being slidably connected to the stem 73. The lever 77 carries a valve operating pin 79 which is adapted to engage the projecting end of the quick release valve N. The valve N is a check valve mounted in the section E of the triple valve and controls a port 80 which is in communication with a passage 81, said valve being yieldingly held to its seat by a spring 82. When the piston M is moved inwardly to full release position the lever 77 will force the quick release valve N from its seat and thereby place passage 81 in communication with the chamber 74 and the emergency vent valve chamber 57. Passage 81 is in direct communication with the emergency reservoir, as will be hereinafter described.

In the section E of the triple valve are arranged three release governing check valves 83, 84, and 85, said valves being arranged close to and directly in line with the valves N and O, as shown clearly in Figs. 3 and 4. Each of the said check valves is mounted in a suitable bushing and is held yieldingly to its seat by a spring 86. Each of the valves control a port leading to a large direct exhaust passage 87 formed in the casing 24. The casing 24 is formed with an individual compartment or cavity which surrounds each of the said valves and separates them and the exhaust cavity 87 from the chambers 23 and 74, as clearly shown in Figs. 3 and 4 of the drawings. These three valves control the quick release and the graduated release operations of the triple valve, being opened when the valve is operated in quick release and closed when the valve is operated in graduated release, as will be fully hereinafter described. In the casing 24, axially in line with the valves 83, 84 and 85 are valve opening plungers 88, the outer ends of which extend into a passage 89 in which is arranged a slidable release governing bar 90. The bar 90 is recessed at 91 to receive the ends of the plungers and one wall of each recess is inclined to form a cam 92. When the valve-operating bar 90 is in the position shown in Fig. 4 the check valves are seated and the ends of the plungers extend into the recesses 91. This is the position of the parts when the triple valve is operating in graduated release. It is manifest that by sliding the bar 90 the cams 92 will move the plungers and force the release governing valves from their seats. This position of the parts is illustrated in the diagrammatic views, Figs. 44 to 48 inclusive, and is the quick release position of the parts.

*Brake pipe reservoir charging position.*

In the initial charging of the system, the increased brake pipe pressure enters the triple valve at 1, and flows therefrom through passage 2 to the main slide valve chamber 4 by way of port 3. Passage 2 connects, by passage and port 58, with chamber 57, thus permitting pressure in the emergency vent valve chamber to be simultaneously built up with that in chamber 4. From chamber 4 communication is also established with chamber 57 through port and passage 59. The purpose of this latter passage will be fully explained in describing the emergency operation of the triple valve. The air pressure thus admitted to chamber 4 will flow to chamber 44 through passage 100, and this communication is not interrupted in any position of the triple valve. The pressure built up in chamber 44 will depress the actuating diaphragm and move the pilot valve to uncover port and passage 101 which runs to a port in the main slide valve seat. From chamber 44 the brake pipe pressure will flow to chamber 8 at one side of the service piston J through passage 101, cavity 102 in the main slide valve and port and passage 103, thus causing an equalization of pressures on both sides of piston J, and permitting pressure in chamber 4 to operate the emergency piston K to full release position as shown in Fig. 44, there being at this time no pressure in chamber 23. In this position of the triple valve the graduating valve I and the main slide valve H will be in a position to permit the pressure in chamber 4 to flow to the brake pipe reservoir through port 104 of the graduating valve, port 105 of the main slide valve, and passage 106 which is provided with a check valve 107, around which is a by-pass 108. Passage 106, between the slide valve seat and the check valve 108, runs through the restriction plate Q in order that it may be varied in capacity for different sizes of reservoirs. The capacity of this by-pass 108 is greatly in excess of the restricted part of passage 106 where it passes through plate Q. Passage 106 is in direct communication with chamber 23 through passage 109, so that the increasing brake pipe reservoir pressure is registered in chamber 23.

Chamber 9 in the release position of the triple valve is in direct communication with chamber 62 on the opposite side of emergency vent valve piston M from the chamber 57, through passage 110, cavity 111 of the main slide valve, and passage 63. In this position of the triple valve a restricted lateral passage 112 feeds the chamber 9 from the brake pipe through cavity 111 and passage 110. Should the brake pipe pressure increase be rapid in the initial charging operation, the piston M will assume the position shown in Fig. 44 and will remain in that position until there is an equalization of pressures in chamber 9 and the brake pipe through the restricted passage 112. Chamber 9 is at this time in direct communication, as previously described, with chamber 62, so that pressures on both sides of said piston will equalize, and spring 67 will operate the emergency piston M and the emergency vent valve L to the position shown in Fig. 45.

When the brake pipe reservoir has been charged to an equality with brake pipe pressure an equalization will exist on both sides of piston K, with the result that spring 114 will operate the graduating valve and the parts directly connected therewith to the position shown in Fig. 45, which is the emergency reservoir charging position.

*Emergency reservoir charging position.*

When the triple valve assumes emergency reservoir charging position, only the graduating valve moves. This operation will move port 104 out of communication with port 105, thus cutting off communication between the brake pipe and the brake pipe reservoir. In this position of the said valve, port 115 in the graduating valve will be in communication with port 116 of the main slide valve, this latter port communicating with passage 117, which leads directly to the emergency reservoir. Passage 117 is provided with a check valve 118 which prevents back-flow of air from the emergency reservoir. The passage 117, between the main slide valve seat and the check valve 118 runs through the restriction plate in order that the size of this charging passage may be varied for different sizes of reservoirs.

Should the brake pipe reservoir pressure be reduced through leakage while the brakes are completely released, the pressure in chamber 23 will necessarily be reduced, with the result that the parts will tend to operate to the right or toward brake pipe reservoir charging position. An elongation 104$^a$ of port 104 is provided so that a slight movement of the graduating valve toward the right hand will open communication between chamber 4 and the brake pipe reservoir, while at the same time maintaining communication between chamber 4 and the emergency reservoir. The object of this dual communication will be fully set forth when describing the service operation of the triple valve.

*Service position.*

When a service brake pipe reduction is made, pressure in chamber 4 is simultaneously reduced therewith, because of the direct communication between said chamber and the brake pipe, by way of passage 2. Should the triple valve at this time be in a position that would maintain open communication between chamber 4, the brake pipe reservoir and the emergency reservoir, because of slight leakage in the brake pipe reservoir, it is manifest that the pressure in chamber 23 must be slightly less than the pressure in chamber 4. This differential, because of the large area of piston K, is very slight and only sufficient to slightly compress the spring 114. It is obvious that when a service brake pipe reduction is made, pressure in chamber 4 will equalize with the slightly reduced pressure on the right side of piston K, with the result that the spring 114 will operate the graduating valve to emergency reservoir charging position, thus cutting off communication between the brake pipe and the brake pipe reservoir. The object of this is to make unnecessary the use of a check valve to prevent the back-flow of brake pipe reservoir pressure to the brake pipe.

A service reduction of brake pipe pressure will necessarily reduce the pressure in actuating chamber 44, as that chamber is in direct communication with chamber 4 through passage 100. As the undisturbed emergency reservoir pressure is in direct communication with chamber 41 through passage 119, the emergency reservoir pressure will predominate over the reduced brake pipe pressure in chamber 44, with the result that the diaphragms and the pilot valve P will be operated upwardly to service position, and communication will be established between passages 101 and 120. This will result in a reduction of pressure in chamber 108 at the left side of piston J, the pressure therein flowing to the brake cylinder through passage 103, cavity 102 in the main slide valve, passage 101 and direct to the brake cylinder through cavity 121 of the pilot valve, passage 120, chamber 43 and passage 122.

The reduction of pressure thus made in chamber 8 will reduce the pressure therein below the brake pipe pressure in chamber 4, resulting in the predominating pressure in chamber 4 moving the piston J and the main slide valve H to service position as shown in Fig. 46. When the parts assume service position brake pipe pressure is again admitted to chamber 8 through port 123 of the graduating valve, port 124 of the main slide valve and passage 103. The admission of brake pipe pressure to chamber 8 tends to equalize the pressures on both sides of piston J and causes said piston to become inoperative, and positively prevents the main slide valve of the triple valve moving past service position when only a service brake pipe reduction is made.

The cavity 102 is so elongated as to maintain communication between passages 101 and 103 in all positions of the triple valve other than emergency. When the triple valve is in service position, cavity 125 releases the pressure in passage 117 beneath the emergency reservoir check valve 118 to atmosphere through passage 126. The purpose of thus releasing the pressure in passage 117 to atmosphere is to permit the high emergency reservoir pressure in passage 117 on the reservoir side of the check valve to positively and firmly seat the said valve to prevent any possible leakage from the emergency reservoir past said check valve.

In service position cavity 111 of the main slide valve affords free communication between chamber 9 and the atmosphere by establishing communication between passage 110 and passage 127, the latter passage leading to poppet valve 85 which is open when operating in quick-release to permit the air from passage 127 to flow to atmosphere, but which is closed when operating in graduated release. In the service position of the main and graduating valves, both brake pipe and brake pipe reservoir pressures will flow direct to the mixing chamber 129, the brake pipe pressure entering said chamber through passage 130 and port 131 of the main slide valve, and the brake pipe reservoir pressure entering said chamber through passage 132 and port 133 of the main slide valve. From the mixing chamber 129 the combined brake pipe and brake pipe reservoir pressures will flow to the brake cylinder through port 134 of the main slide valve and passage 135. This communication will be maintained until a sufficient brake cylinder pressure has been built up in chamber 43 to cause the pilot valve to assume lap position. In the lap position of the pilot valve communication between the chamber 8 at the left side of piston J and the brake cylinder will be closed, thereby permitting an equalization of pressures on both sides of piston J through the port 123 and lap port 124. Spring 114 will then operate the graduating valve to service lap position, cutting off communication between the lap ports 123 of the graduating valve and 124 of the main slide valve, and closing communication between passages 133, 131, 134 and the mixing chamber 129.

Passages 130, 132 and 135 run through the restriction plate Q, in order that the capacities of these application ports may be varied for different sizes of brake cylinders.

*Quick release.*

When the necessary increase in brake pipe pressure is made to effect a release of the brakes, pressure in chamber 4 is likewise increased. With the brakes applied and the graduating valve in service lap position there is no communication between the brake pipe and the brake pipe reservoir. The increased pressure in chamber 4 above the non-rising pressure in chamber 23 will operate the parts of the triple valve to release position as shown in Fig. 44. The cavity 111 in the main slide valve will vent the pressure in chamber 62 at one side of the piston M into chamber 9 by way of passages 63 and 110, chamber 9 having been previously emptied when the triple valve assumed service position, as hereinbefore described. As chamber 57 at the other side of piston M is at this time in direct communication with the brake pipe through passage 2, port 3 in the main slide valve seat, port 58 in the emergency vent valve seat, and port and passage 59, this pressure will predominate, thus causing piston M to operate the emergency vent valve to the position shown in Fig. 44. This operation will cause the collar 75 to engage the lever 77 which in turn will engage and open the quick-release valve N thus permitting the undisturbed emergency reservoir pressure to flow into the vent valve chamber 57, through passage 81. From chamber 57 direct communication exists through passage 58 and passage 2 to the brake pipe, and there will be a quick equalization between the emergency reservoir pressure admitted to chamber 57 and the brake pipe. The release of this emergency reservoir pressure will materially hasten and make positive the propagation of the release of the brakes throughout a long train.

The piston M and the emergency vent valve L will remain in the position just described until the pressures in chambers 9 and 62 are raised to an equality with the brake pipe pressure in chamber 57 by brake pipe air flowing directly through restricted passage 112, cavity 111 and passages 63 and 110. The spring 67 will then operate piston M toward the chamber 57 to permit the closing of the quick release valve N.

To assure a positive release of the brakes when operating in quick release, pistons J and K may operate from service lap position toward full-release position with no spring resistance because of the free movement made possible by the spacing between the shoulder 15 and the washer 17, as shown in Figs. 1 and 45. With the triple valve in service lap position, communication is established between passages 136 and 137 of the main slide valve through cavity 138 of the graduating valve. This relative position between the graduating valve and the main slide valve does not change when operating toward release position and the permissible free movement of the main slide valve without spring resistance will open port 137 to passage 127, thus permitting a release of pressure in the brake pipe reservoir, which is in direct communication with chamber 23 at the right side of piston K, to atmosphere through passages 109, 139, port 136 of the main slide valve, cavity 138 of the graduating valve, port 137 of the main slide valve, passage 127 and past the valve 85, it being understood that said valve is open only when operating in quick-release with the bar 90 in quick-release position. This decrease of pressure in chamber 23 below the brake pipe pressure in chamber 4, the latter being augmented by the flow of emergency reservoir pressure to the brake pipe, chamber 4 being in direct communication with the brake pipe through port 3 in the main slide valve seat, results in a positive release operation of the triple valve.

After the required differential in pressure has been established between chamber 23 and chamber 4, the parts will assume full-release and brake pipe reservoir charging position, as shown in Fig. 44.

To assure positive operation of the triple valve parts to full-release position, there is no communication between the brake pipe, brake pipe reservoir and chamber 23 until the main slide valve has made the full travel to that position. Because of this it is not possible to disturb the differential in pressure between chambers 4 and 23 during the release movement of the main and graduating valves. In the full release position of the valves port 105 of the main slide valve will register with passage 106 and, as at this time port 104 is in register with port 105, the brake pipe reservoir pressure will then be restored.

The operation of the triple valve thereafter is precisely as set forth in the description of brake pipe reservoir and emergency reservoir charging positions.

With the parts of the triple valve in full release position, brake cylinder pressure is released to atmosphere through passage 135, passage 140, cavity 141 in the main slide valve, port and passage 142 and past poppet valve 84. Passage 140 runs through the restriction plate Q, in order that its capacity may be varied for different sizes of brake cylinders.

The retention chamber 42 of the pilot valve structure will be vented to atmosphere through passage 143 and valve 83, and there will be no build-up of brake cylinder pressure in said chamber when the pilot valve moves to release position.

In the passage 81 is arranged a check valve 81$^a$. The purpose of this check valve is to prevent over-charging of the emergency reservoir during the release period when there is a high brake pipe pressure in chamber 57. Should this high brake pipe pressure be sufficient to unseat valve N, the check valve 81$^a$ will prevent the passage of air to the emergency reservoir.

*Graduated release position.*

When operating in graduated release, bar 90 is moved to the left, to permit the stems of poppet valves 83, 84 and 85 to enter recesses 91 of bar 90, and all three of said valves to close. The valve 83 will close passage 143 and cut off communication between chamber 42 and the atmosphere; valve 84 will close passage 142 and prevent the free release of brake cylinder pressure to the atmosphere by way of the main slide valve; the closing of valve 85 will close passage 127 and prevent the release of pressure from chamber 9, when the triple valve assumes service position, and will also prevent the release of pressure from chamber 23 when the parts are operated toward release position. The prevention of the release of pressure from chamber 9 will render the quick-release means inoperative, because when the triple valve parts assume full-release position, there will be no reduction in pressure in chamber 62. Therefore, when the poppet valves 83, 84 and 85 are closed there will be no movement of piston M, and the parts directly connected therewith, past the position shown in Fig. 46, regardless of the positions of the main and graduating valves.

The pilot valve seat is formed with a port 144 which is connected by a passage 145 to a port in the main slide valve seat. In the main slide valve is formed a long groove 146 which in all positions of the main slide valve except emergency position connects passage 145 with a port and passage 147, this latter passage leading directly to atmosphere. This exhaust passage 147 runs through restriction plate Q and is restricted therein to give the desired rate of blow-down for a given size of brake cylinder. The retention chamber is connected by passage 143 to a port controlled by valve 83. With the release governing bar 90 in graduated release position, as shown in Figs. 4 and 5, valve 83 is closed, so that pressure from the retention chamber 42 can escape to atmosphere only through the small blow down port in the passage 147. When, however, the release governing bar is in quick release position the pressure will freely exhaust from the retention chamber through the passage 143, past valve 83 and out through the exhaust port 87.

The pilot valve is provided with a small groove 148 which in the lap position of said valve connects the exhaust port 144 with a branch port 149 of a passage 150 leading from the retention chamber. The purpose of the groove 148 is to permit the pressure in the retention chamber to slowly blow down when the pilot valve is in lap position. When the pilot valve is in service position, as illustrated in Figs. 34–35, the cavity 121 connects port 101 to the passage 120 and the ports and passages 144, 149 and 150 are closed. The passage 143 leads only to the valve 83, in order that the blow down from chamber 42 shall take place only through the passage 145 when the release governing bar is in graduated release position.

With the pilot valve in application position, ports 144, 149, 150 are closed. With the release governing bar in graduated release position and valve 83 closed, and the pilot valve in lap position, any pressure in the retention chamber 42 will slowly blow down through 150 and 149, the small groove 148 in the pilot valve and thence through port 144, passage 145, cavity 146 and passage 147.

The size of the restricted blow-down port in the passage 147 will be proportioned to give the desired rate of blow-down from a given size brake cylinder and will be varied for brake cylinders of different sizes. The exhaust of brake cylinder pressure takes place through this restricted port only when the pilot valve is in release position. It is desirable that the rate of blow-down from the brake cylinders in the release position of the pilot valve shall be uniform for all sizes of brake cylinders in order that the build-up of pressure in the retention chamber 42 shall be uniform or substantially so, in all equipment. The small groove 148 permits the blow-down of the pressure in the retention chamber 42 when the pilot valve is in lap position. This groove is of smaller capacity than the blow-down port in passage 147, and will be uniform for all triple valves because the retention chamber will be of uniform capacity in all triple valves.

When the main slide valve is in emergency position, groove 146 is out of register with port and passage 145 and said port and passage is closed. This will prevent the blow-down of pressure from the retention chamber and from the control chamber through passage 147 without regard to the position of the pilot valve.

*Emergency position.*

When the emergency brake pipe reduction is made, the pressure in chamber 4 will be reduced with the brake pipe through port 3 and passage 2; and likewise in chamber 57 through port and passage 58 and passage 2. This reduction of pressure in chamber 4 permits the pressure in chamber 23 to move the emergency piston K toward emergency position. As the main slide valve passes service position the brake pipe reservoir and the brake pipe will be in communication with each other and with the brake cylinder for a brief period, but the reduction of pressure in chambers 4 and 57 will be more rapid than the reduction of pressure in the brake pipe reservoir, due to the restriction of passage 132, and a differential will be set up, and maintained, on piston K that will move the main and graduating valve past service position to the extreme left, or emergency position, as shown in Figs. 47 and 48. This operation will first open the emergency reservoir valve O admitting the high undisturbed emergency reservoir pressure to chamber 23. Practically full emergency reservoir pressure will be registered in chamber 23 because of the size of the restriction 108 around check valve 107; and this pressure will be admitted to chamber 62 at one side of the emergency vent valve piston M through passages 109 and 151, cavity 141 in the main slide valve and passage 63. The admission of this high emergency reservoir pressure to chamber 62 will move the piston M and the emergency vent valve L to the position shown in Fig. 47. This operation will vent the brake pipe pressure to atmosphere through the passage 2, passage 58 and the port in the emergency vent valve seat, cavity 128 of the emergency vent valve, and passage 152 which leads direct to the atmosphere.

Chamber 8 at the left side of piston J will also be vented to atmosphere through passage 153, cavity 154 of the emergency vent valve and passage 155 which leads direct to atmosphere. This assures the movement of the main and graduating valves to full-emergency position.

In the emergency position of the main slide valve, ports 156 and 157 are uncovered, permitting the emergency reservoir pressure that enters chamber 23 to flow to the brake cylinder through a lateral passage 158 leading from passage 109, to port 157 of chamber 4 and direct to the brake cylinder by way of port 156, passage 159 which connects with passage 140, and passage 135. Passage 158 runs through the restriction plate Q in order that its capacity may be varied for different sizes of brake cylinders.

When making a straight emergency application, with both the emergency and brake pipe reservoirs fully charged, brake pipe reservoir pressure will flow past check valve 107 and into passage 109. From this passage, both the brake pipe reservoir and emergency reservoir pressures will flow direct to the brake cylinder through chamber 4, as above described.

Should the emergency brake pipe reduction take place after a full service brake application, the brake pipe reservoir will be depleted to the extent of the brake pipe reduction. Therefore, the emergency reservoir pressure entering chamber 23, when the triple valve assumes emergency position, will slowly flow to the brake pipe reservoir through by-pass 108 around check valve 107.

*Emergency lap position.*

With the parts of the triple valve in the position shown in Fig. 47, the piston M being at the extreme limit of its travel, the spring 67 will be under compression because of the admission of the high emergency reservoir pressure from chamber 23 at the right side of piston K.

In the emergency position, the main slide valve affords free and open communication between the brake cylinder and chamber 57 through brake cylinder port 140, cavity 161 in the main slide valve and port and passage 162 leading to chamber 57. When the reducing emergency reservoir pressure equalizes with the increasing brake cylinder pressure, equalization will occur on both sides of piston M with the result that spring 57, which is at this time under compression, will move the piston M and the parts directly connected therewith, toward chamber 62 and the emergency vent valve L will then be in the position shown in Fig. 48. This position of the said vent valve will cut off communication between passage 58 and the exhaust passage 152, thereby closing communication between the brake pipe and atmosphere, and making it possible to effect a release of the brakes by the usual increase in brake pipe pressure. Chamber 8 which, during the emergency operation of the triple valve was vented to atmosphere, is, when the emergency vent valve L returns to emergency lap position, in direct communication with the brake pipe through brake pipe port 163, cavity 102 of the main slide valve, port and passage 164 leading to the emergency vent valve seat, cavity 154 of said vent valve, and passage 153, so that the increasing brake pipe pressure to effect a release of the brakes is registered in said chamber 8. The passage 162 runs through the retention plate Q.

*Release after an emergency application.*

If a release after an emergency application is made before the depletion of the air pressure in the system, the pressure in chamber 8 at the left side of the service piston J will first be equalized with the brake cylinder pressure existing in chamber 4. The graduating spring 114 will then move the main slide valve and the graduating valve to service lap position. The first result of this operation will be to establish communication between passages 136 and 137 by way of cavity 138, said communication venting pressure from chamber 62 to atmosphere through passages 63, branch port 165, port 136, cavity 138, port 137, and passage 166 leading to atmosphere. Because of the dimensional differences between the collars 69 and 68, and the shoulders 71 and 70, there is permitted a free movement of the piston M without spring resistance; thus the release of pressure from the chamber 62, as described, results in a movement of the piston M, so that the collar 69 will engage the shoulder 71, the increasing brake pipe pressure at this time being registered in chamber 57, by way of passage 59. This movement of the emergency valve will uncover the port 58 so that any rapid or sudden increase in brake pipe pressure will not tend to raise the said valve from its seat.

When the main slide valve H and the graduating valve I have assumed service lap position because of the equalization of pressure on both sides of piston J, a further increase in brake pipe pressure after this said equalization occurs will increase the pressure in chamber 4 over the brake pipe reservoir pressure in chamber 23, the admission of brake pipe pressure to chamber 4 being through passage 2 and port 3. The parts will then be operated to full-release and brake pipe reservoir charging position, and both the brake pipe reservoir and the emergency reservoir will then again be recharged as hereinbefore described.

Should the pressure in the system be entirely depleted after an emergency brake application, (as might occur at terminals by the brakemen opening the angle cock after cutting off the engine,) the emergency vent valve L will then be in the position shown in Fig. 48 and the port 58 which leads direct to the brake pipe will be covered. To protect against the brake pipe pressure lifting the said valve from its seat in this position, port and passage 59 is provided. Passage 59 is never closed by the vent valve L.

When the pressure in the system is entirely depleted, the graduating spring 114 will operate the main slide valve H and the graduating valve I to service lap position, uncovering ports 3 and 59 in the main slide valve seat, and admitting brake pipe pressure to chamber 57, through port and passage 59. The brake pipe pressure thus admitted to chamber 57 will operate the piston M and the vent valve L toward chamber 62 without any spring resistance, thereby uncovering port 58 and preventing any rapid increase in brake pipe pressure from lifting the valve L from its seat. The parts of the triple valve will then be operated to release position and the brake pipe reservoir and emergency reservoir will be charged as previously described.

What I claim is:

1. A triple valve for an air brake apparatus comprising a main slide valve, a graduating valve, a piston operatively connected to said valves and operating in response to a reduction in brake pipe pressure to move the said valves to service application position to admit air to a brake cylinder and operating in response to an increase in breake pipe pressure to move the said valves into position to exhaust air from the brake cylinder, and a detachable restriction plate secured to the triple valve body and provided with passages adapted to form parts of the brake cylinder supply passage and the brake cylinder exhaust passage, whereby air flowing to the brake cylinder for an application of the brakes and from the brake cylinder for a release of the brakes must pass through the said passages in the restriction plate.

2. A triple valve for air brake apparatus comprising a main slide valve, a graduating valve, a piston operatively connected to said valves and operating in response to a reduction in brake pipe pressure to move the said valves to service application position to admit air from a brake pipe and a brake pipe reservoir to a brake cylinder, and a detachable restriction plate secured to the triple valve body and provided with passages adapted to form parts of the supply passages leading from the brake pipe and the brake pipe reservoir to the main slide valve whereby air flowing through said passages to the brake cylinder for an application of the brakes must pass through the said passages in the restriction plate.

3. A triple valve for an air brake apparatus and adapted for use with a brake pipe reservoir and an emergency reservoir and comprising a main slide valve, a graduating valve, a piston operatively connected to said valves and operating upon an increase of brake pipe pressure to move said valves to brake pipe reservoir charging position, means to move the graduating valve to emergency reservoir charging position upon an equalization of pressures in the brake pipe and the brake pipe reservoir, and a detachable restriction plate secured to the triple valve body and provided with passages which form parts of the reservoir charging passages whereby air flowing from the main slide valve to the brake pipe reservoir and to the emergency reservoir must pass through the said passages in the restriction plate.

4. A triple valve for an air brake apparatus comprising means operating in response to a reduction of brake pipe pressure to admit air to a brake cylinder for an application of the brakes, said means operating in response to an increase in brake pipe pressure to release air from the brake cylinder and to open communication between the brake pipe and a reservoir, and a restriction plate detachably secured to the exterior of the triple valve body and provided with passages through which air must pass to and from the reservoir, whereby the size of the passages in the restriction plate will control the flow of air through said passages.

5. A triple valve for air brake apparatus formed with a main brake pipe chamber provided with a brake pipe connection and having aligned cylindrical extensions of different diameters at its opposite ends, a service piston in the smaller extension of said chamber, a larger release and emergency piston in the larger extension of said chamber, a supplemental brake pipe chamber on the opposite side of the service piston from the main brake pipe chamber, an emergency valve chamber on the opposite side of the emergency and release piston from the main brake pipe chamber, a main slide valve in the main brake pipe chamber, a graduating valve in said chamber, means rigidly connecting said valves to the service piston and to the release and emergency piston, the main and graduating valves being formed with ports and passages to control the admission and release of brake cylinder pressure, an emergency reservoir valve, means whereby the emergency piston in emergency position will open said emergency reservoir valve and thereby permit the emergency reservoir air to flow into the emergency valve chamber and means connecting said chamber to the brake cylinder.

6. A triple valve for air brake apparatus formed with a main brake pipe chamber provided with a brake pipe connection and having aligned cylindrical extensions of different diameters at its opposite ends, a service piston in the smaller extension of said chamber, a larger release and emergency piston in the larger extension of said chamber, a supplemental brake pipe chamber on the opposite side of the service piston from the main brake pipe chamber, an emergency valve chamber on the opposite side of the emergency and release piston from the main brake pipe chamber, a main slide valve in the main brake pipe chamber, a graduating valve in said chamber, means rigidly connecting said valves to the service piston and to the release and emergency piston, the main and graduating valves being formed with ports and passages to control the admission and release of brake cylinder pressure, an emergency vent valve chamber, an emergency vent valve therein, a quick release chamber, an emergency vent valve piston separating said chambers and subject to the pressures therein, means operatively connecting the emergency vent valve to the emergency vent valve piston, a quick release valve controlling communication between the emergency vent valve chamber and an emergency reservoir, means whereby an increase of pressure in the emergency vent valve chamber will cause the emergency vent valve piston to open the quick release valve, means affording communication between emergency vent valve chamber and the brake pipe, and means whereby the emergency vent valve in emergency position will vent the brake pipe and the supplemental brake pipe chamber to atmosphere.

7. A triple valve for air brake apparatus formed with a main brake pipe chamber provided with a brake pipe connection and having aligned cylindrical extensions of different diameters at its opposite ends, a service piston in the smaller extension of said chamber, a larger release and emergency piston in the larger extension of said chamber, a supplemental brake pipe chamber on the opposite side of the service piston from the main brake pipe chamber, an emergency valve chamber on the opposite side of the emergency and release piston from the main brake pipe chamber, a main slide valve in the main brake pipe chamber, a graduating valve in said chamber, means rigidly connecting said valves to the service piston and to the release and emergency piston, the main and graduating valves being formed with ports and passages to control the admission and release of brake cylinder pressure, an emergency vent valve chamber, an emergency vent valve therein, a quick release chamber, an emergency vent valve piston separating said chambers and subject to the pressures therein, means operatively connecting the emergency vent valve to the emergency vent valve piston, a quick release valve controlling communication between the emergency vent valve chamber and an emergency reservoir, means whereby an increase of pressure in the emergency vent valve chamber will cause the emergency vent valve piston to open the quick release valve, means affording communication between emergency vent valve chamber and the brake pipe, means whereby the emergency vent valve in emergency position will vent the brake pipe and the supplemental brake pipe chamber to atmosphere, a graduating spring operatively connected to the service piston to be placed under tension when the main and graduating valves are in service position and serving to move the graduating valve to lap position upon an equalization of pressures in the main and supplemental brake pipe chambers.

8. A triple valve for air brake apparatus formed with a main brake pipe chamber provided with a brake pipe connection and having aligned cylindrical extensions of different diameters at its opposite ends, a service piston in the smaller extension of said chamber, a larger release and emergency piston in the larger extension of said chamber, a supplemental brake pipe chamber on the opposite side of the service piston from the main brake pipe chamber, an emergency valve chamber on the opposite side of the emergency and release piston from the main brake pipe chamber, a main slide valve in the main brake pipe chamber, a graduating valve in said chamber, means rigidly connecting said valves to the service piston and to the release and emergency piston, the main and graduating valves being formed with ports and passages to control the admission and release of brake cylinder pressure, an emergency vent valve chamber, an emergency vent valve therein, a quick release chamber, an emergency vent valve piston separating said chambers and subject to the pressures therein, means operatively connecting the emergency vent valve to the emergency vent valve piston, a quick release valve controlling communication between the emergency vent valve chamber and an emergency reservoir, means whereby an increase of pressure in the emergency vent valve chamber will cause the emergency vent valve piston to open the quick release valve, means affording communication between emergency vent valve chamber and the brake pipe, means whereby the emergency vent valve in emergency position will vent the brake pipe and the supplemental brake pipe chamber to atmosphere, a graduating spring operatively connected to the service piston to be placed under tension when the main and graduating valves are in service position and serving to move the graduating valve to lap position upon an equalization of pressures in the main and supplemental brake pipe chambers, and means whereby the service piston and the release and emergency pistons and the connected valves may have a limited free movement independently of the graduating spring.

9. A triple valve for air brake apparatus formed with a main brake pipe chamber provided with a brake pipe connection and having aligned cylindrical extensions of different diameters at its opposite ends, a service piston in the smaller extension of said chamber, a larger release and emergency piston in the larger extension of said chamber, a supplemental brake pipe chamber on the opposite side of the service piston from the main brake pipe chamber, an emergency valve chamber on the opposite side of the emergency and release piston from the main brake pipe chamber, a main slide valve in the main brake pipe chamber, a graduating valve in said chamber, means rigidly connecting said valves to the service piston and to the release and emergency piston, the main and graduating valves being formed with ports and passages to control the admission and release of brake cylinder pressure, an emergency vent valve chamber, an emergency vent valve therein, a quick release chamber, an emergency vent valve piston separating said chambers and subject to the pressures therein, means operatively connecting the emergency vent valve to the emergency vent valve piston, a quick release valve controlling communication between emergency vent valve chamber and an emergency reservoir, means whereby an increase of pressure in the emergency vent valve chamber will cause the emergency vent valve piston to open the quick release valve, means affording communication between emergency vent valve chamber and the brake pipe, means whereby the emergency vent valve in emergency position will vent the brake pipe and the supplemental brake pipe chamber to atmosphere, a volume chamber, means whereby the main slide valve in service position will vent said volume chamber to atmosphere, and means whereby the main slide valve in release position will connect said volume chamber to the quick release chamber and to a restricted brake pipe port.

10. A triple valve for air brake apparatus formed with a main brake pipe chamber provided with a brake pipe connection and having aligned cylindrical extensions of different diameters at its opposite ends, a service piston in the smaller extension of said chamber, a larger release and emergency piston in the larger extension of said chamber, a supplemental brake pipe chamber on the opposite side of the service piston from the main brake pipe chamber, an emergency valve chamber on the opposite side of the emergency and release piston from the main brake pipe chamber, a main slide valve in the main brake pipe chamber, a graduating valve in said chamber, means rigidly connecting said valves to the service piston and to the release and emergency piston, the main and graduating valves being formed with ports and passages to control the admission and release of brake cylinder pressure, an emergency vent valve chamber, an emergency vent valve therein, a quick release chamber, an emergency vent valve piston separating said chambers and subject to the pressures therein, means operatively connecting the emergency vent valve to the emergency vent valve piston, a quick release valve controlling communication between the emergency vent valve chamber and an emergency reservoir, means whereby an increase of pressure in the emergency vent valve chamber will cause the emergency vent valve piston to open the quick release valve, means affording communication between emergency vent valve chamber and the brake pipe, means whereby the emergency vent valve in emergency position will vent the brake pipe and the supplemental brake pipe chamber to atmosphere, a volume chamber, means whereby the main slide valve in service position will vent said volume chamber to atmosphere, means whereby the main slide valve in release position will connect said volume chamber to the quick release chamber and to a restricted brake pipe port, and a manually operable valve to control the release of pressure to atmosphere from the quick release chamber.

11. A triple valve for air brake apparatus formed with a main brake pipe chamber provided with a brake pipe connection and having aligned cylindrical extensions of different diameters at its opposite ends, a service piston in the smaller extension of said chamber, a larger release and emergency piston in the larger extension of said chamber, a supplemental brake pipe chamber on the opposite side of the service piston from the main brake pipe chamber, an emergency valve chamber on the opposite side of the emergency and release piston from the main brake pipe chamber, a main slide valve in the main brake pipe chamber, a graduating valve in said chamber, means rigidly connecting said valves to the service piston and to the release and emergency piston, the main and graduating valves being formed with ports and passages to control the admission and release of brake cylinder pressure, an emergency vent valve chamber, an emergency vent valve therein, a quick release chamber, an emergency vent valve piston separating said chambers and subject to the pressures therein, means operatively connecting the emergency vent valve to the emergency vent valve piston, a quick release valve controlling communication between the emergency vent valve chamber and an emergency reservoir, means whereby an increase of pressure in the emergency vent valve chamber will cause the emergency vent valve piston to open the quick release valve, means affording communication between emergency vent valve chamber and the brake pipe, and means whereby the emergency vent valve in emergency position will vent the brake pipe to atmosphere.

12. A triple valve for air brake apparatus formed with a main brake pipe chamber provided with a brake pipe connection and having aligned cylindrical extensions of different diameters at its opposite ends, a service piston in the smaller extension of said chamber, a larger release and emergency piston in the larger extension of said chamber, a supplemental brake pipe chamber on the opposite side of the service piston from the main brake pipe chamber, an emergency valve chamber on the opposite side of the emergency and release piston from the main brake pipe chamber, a main slide valve in the main brake pipe chamber, a graduating valve in said chamber, means rigidly connecting said valves to the service piston and to the release and emergency piston, the main and graduating valves being formed with ports and passages to control the admission and release of brake cylinder pressure, an emergency vent valve chamber, an emergency vent valve therein, a quick release chamber, an emergency vent valve piston separating said chambers and subject to the pressures therein, means operatively connecting the emergency vent valve to the emergency vent valve piston, a quick release valve controlling communication between the emergency vent valve chamber and an emergency reservoir, means whereby an increase of pressure in the emergency vent valve chamber will cause the emergency vent valve piston to open the quick release valve, means affording communication between emergency vent valve chamber and the brake pipe, means whereby the emergency vent valve in emergency position will vent the brake pipe to atmosphere, a volume chamber, means whereby the main slide valve in service position will vent said volume chamber to atmosphere, and means whereby the main slide valve in release position will connect said volume chamber to the quick release chamber and to the brake pipe.

13. A triple valve for air brake apparatus formed with a main brake pipe chamber provided with a brake pipe connection and having aligned cylindrical extensions of different diameters at its opposite ends, a service piston in the smaller extension of said chamber, a larger release and emergency piston in the larger extension of said chamber, a supplemental brake pipe chamber on the opposite side of the service piston from the main brake pipe chamber, an emergency valve chamber on the opposite side of the emergency and release piston from the main brake pipe chamber, a main slide valve in the main brake pipe chamber, a graduating valve in said chamber, means rigidly connecting said valves to the service piston and to the release and emergency piston, the main and graduating valves being formed with ports and passages to control the admission and release of brake cylinder pressure, a manually operable valve to control the release of pressure to atmosphere from the quick release chamber, an emergency vent valve chamber, an emergency vent valve therein, a quick release chamber, an emergency vent valve piston separating said chambers and subject to the pressure therein, means operatively connecting the emergency vent valve to the emergency vent valve piston, a quick release valve controlling communication between the emergency vent valve chamber and an emergency reservoir, means whereby an increase of pressure in the emergency vent valve chamber will cause the emergency vent valve piston to open the quick release valve, means affording communication between emergency vent valve chamber and the brake pipe, means whereby the emergency vent valve in emergency position will vent the brake pipe and the supplemental brake pipe chamber to atmosphere, a volume chamber, means whereby the main slide valve in service position will vent said volume chamber to atmosphere, and means whereby the main slide valve in release position will connect said volume chamber to the quick release chamber and to the brake pipe.

14. A triple valve for air brake apparatus formed with a main brake pipe chamber provided with a brake pipe connection and having aligned cylindrical extensions of different diameters at its opposite ends, a service piston in the smaller extension of said chamber, a larger release and emergency piston in the larger extension of said chamber, a supplemental brake pipe chamber on the opposite side of the service piston from the main brake pipe chamber, an emergency valve chamber on the opposite side of the emergency and release piston from the main brake pipe chamber, a main slide valve in the main brake pipe chamber, a graduating valve in said chamber, means rigidly connecting said valves to the service piston and to the release and emergency piston, the main and graduating valves being formed with ports and passages to control the admission and release of brake cylinder pressure, an emergency reservoir valve, means whereby the emergency piston in emergency position will open said emergency reservoir valve and thereby permit the emergency reservoir air to flow into the emergency valve chamber, means affording communication between said emergency vent valve chamber and the brake cylinder, an emergency vent valve chamber, an emergency vent valve therein, a quick release chamber, an emergency vent valve piston separating said chambers and subject to the pressures therein, means operatively connecting the emergency vent valve to the emergency vent valve piston, a quick release valve controlling communication between the emergency vent valve chamber and an emergency reservoir, means whereby an increase of pressure in the emergency vent valve chamber will cause the emergency vent valve piston to open the quick release valve, means affording communication between emergency vent valve chamber and the brake pipe, means whereby the emergency vent valve in emergency position will vent the brake pipe and the supplemental brake pipe chamber to atmosphere, a volume chamber, means whereby the main slide valve in service position will vent said volume chamber to atmosphere, and means whereby the main slide valve in release position will connect said volume chamber to the quick release chamber and to the brake pipe.

15. A triple valve for air brake apparatus formed with a main brake pipe chamber provided with a brake pipe connection and having aligned cylindrical extensions of different diameters at its opposite ends, a service piston in the smaller extension of said chamber, a larger release and emergency piston in the larger extension of said chamber, a supplemental brake pipe chamber on the opposite side of the service piston from the main brake pipe chamber, an emergency valve chamber on the opposite side of the emergency and release piston from the main brake pipe chamber, a main slide valve in the main brake pipe chamber, a graduating valve in said chamber, means rigidly connecting said valves to the service piston and to the release and emergency piston, the main and graduating valves being formed with ports and passages to control the admission and release of brake cylinder pressure, an emergency reservoir valve, means whereby the emergency piston in emergency position will open said emergency reservoir valve and thereby permit the emergency reservoir air to flow into the emergency valve chamber, means affording communication between said emergency vent valve chamber and the brake cylinder, an emergency vent valve chamber, an emergency vent valve therein, a quick release chamber, an emergency vent valve piston separating said chambers and subject to the pressures therein, means operatively connecting the emergency vent valve to the emergency vent valve piston, a quick release valve controlling communication between the emergency vent valve chamber and an emergency reservoir, means whereby an increase of pressure in the emergency vent valve chamber will cause the emergency vent valve piston to open the quick release valve, means affording communication between the emergency vent valve chamber and the brake pipe, means whereby the emergency vent valve in emergency position will vent the brake pipe and the supplemental brake pipe chamber to atmosphere, a volume chamber, means whereby the main slide valve in service position will vent said volume chamber to atmosphere, means whereby the main slide valve in release position will connect said volume chamber to the quick release chamber and to the brake pipe, and a manually operable valve to control the release of pressure to atmosphere from the quick release chamber.

16. A triple valve for air brake apparatus formed with a main brake pipe chamber provided with a brake pipe connection and having aligned cylindrical extensions of different diameters at its opposite ends, a service piston in the smaller extension of said chamber, a larger release and emergency piston in the larger extension of said chamber, a supplemental brake pipe chamber on the opposite side of the service piston from the main brake pipe chamber, an emergency valve chamber on the opposite side of the emergency and release piston from the main brake pipe chamber, a main slide valve in the main brake pipe chamber, a graduating valve in said chamber, means rigidly connecting said valves to the service piston and to the release and emergency piston, the main and graduating valves being formed with ports and passages to control the admission and release of brake cylinder pressure, an emergency reservoir valve, means whereby the emergency piston in emergency position will open said emergency reservoir valve and thereby permit the emergency reservoir air to flow into the emergency valve chamber, means affording communication between said emergency vent valve chamber and the brake cylinder, an emergency vent valve chamber, an emergency vent valve therein, a quick release chamber, an emergency vent valve piston separating said chambers and subject to the pressures therein, means operatively connecting the emergency vent valve to the emergency vent valve piston, means affording communication between emergency vent valve chamber and the brake pipe, means whereby the emergency vent valve in emergency position will vent the brake pipe to atmosphere, and means whereby the main slide valve in emergency position will connect the emergency valve chamber to the quick release chamber.

17. A triple valve for air brake apparatus formed with a main brake pipe chamber provided with a brake pipe connection and having aligned cylindrical extensions of different diameters at its opposite ends, a service piston in the smaller extension of said chamber, a larger release and emergency piston in the larger extension of said chamber, a supplemental brake pipe chamber on the opposite side of the service piston from the main brake pipe chamber, an emergency valve chamber on the opposite side of the emergency and release piston from the main brake pipe chamber, a main slide valve in the main brake pipe chamber, a graduating valve in said chamber, means rigidly connecting said valves to the service piston and to the release and emergency piston, the main and graduating valves in service application position connecting a brake pipe port and a brake pipe reservoir port to the brake cylinder for a service application of the brakes, an emergency reservoir valve, means whereby the emergency piston in emergency position will open said emergency reservoir valve and thereby permit the emergency reservoir air to flow into the emergency valve chamber, means affording communication between said emergency vent valve chamber and the brake cylinder when the main slide valve is in emergency position, an emergency vent valve chamber, an emergency vent valve therein, a quick release chamber, an emergency vent valve piston separating said chambers and subject to the pressures therein, means operatively connecting the emergency vent valve to the emergency vent valve piston, means affording communication between the emergency vent valve chamber and the brake pipe, and means whereby the emergency vent valve in emergency position will vent the brake pipe and the supplemental brake pipe chamber to atmosphere.

18. A triple valve for air brake apparatus formed with a main brake pipe chamber provided with a brake pipe connection and having aligned cylindrical extensions of different diameters at its opposite ends, a service piston in the smaller extension of said chamber, a larger release and emergency piston in the larger extension of said chamber, a supplemental brake pipe chamber on the opposite side of the service piston from the main brake pipe chamber, an emergency valve chamber on the opposite side of the emergency and release piston from the main brake pipe chamber, a main slide valve in the main brake pipe chamber, a graduating valve in said chamber, means rigidly connecting said valves to the service piston and to the release and emergency piston, the main and graduating valves in service application position connecting a brake pipe port and a brake pipe reservoir port to the brake cylinder for a service application of the brakes, an emergency reservoir valve, means whereby the emergency piston in emergency position will open said emergency reservoir valve and thereby permit the emergency reservoir air to flow into the emergency valve chamber, means affording communication between said emergency vent valve chamber and the brake cylinder when the main slide valve is in emergency position, an emergency vent valve chamber, an emergency vent valve therein, a quick release chamber, an emergency vent valve piston separating said chambers and subject to the pressure therein, means operatively connecting the emergency vent valve to the emergency vent valve piston, means affording communication between emergency vent valve chamber and the brake pipe, means whereby the emergency vent valve in emergency position will vent the brake pipe and the supplemental brake pipe chamber to atmosphere, and means whereby the main slide valve in emergency position will connect the emergency valve chamber to the quick release chamber.

19. A triple valve for air brake apparatus formed with a main brake pipe chamber provided with a brake pipe connection and having aligned cylindrical extensions of different diameters at its opposite ends, a service piston in the smaller extension of said chamber, a larger release and emergency piston in the larger extension of said chamber, a supplemental brake pipe chamber on the opposite side of the service piston from the main brake pipe chamber, an emergency valve chamber on the opposite side of the emergency and release piston from the main brake pipe chamber, a main slide valve in the main brake pipe chamber, a graduating valve in said chamber, means rigidly connecting said valves to the service piston and to the release and emergency piston, the main and graduating valves being formed with ports and passages to control the admission and release of brake cylinder pressure, an emergency vent valve chamber, an emergency vent valve therein, a quick release chamber, an emergency vent valve piston separating said chambers and subject to the pressures therein, means operatively connecting the emergency vent valve to the emergency vent valve piston, a quick release valve controlling communication between the emergency vent valve chamber and an emergency reservoir, means whereby an increase of pressure in the emergency vent valve chamber will cause the emergency vent valve piston to open the quick release valve, means affording communication between the emergency vent valve chamber and the brake pipe, means whereby the emergency vent valve in emergency position will vent the brake pipe to atmosphere, a volume chamber, means whereby the main slide valve in service position will connect the said volume chamber to an atmospheric port, a manually operable valve to open and close said port, and means whereby the main slide valve in release position will connect said volume chamber to the quick release chamber, and to a brake pipe port.

20. A triple valve for air brake apparatus formed with a main brake pipe chamber provided with a brake pipe connection and having aligned cylindrical extensions of different diameters at its opposite ends, a service piston in the smaller extension of said chamber, a larger release and emergency piston in the larger extension of said chamber, a supplemental brake pipe chamber on the opposite side of the service piston from the main brake pipe chamber, an emergency valve chamber on the opposite side of the emergency and release piston from the main brake pipe chamber, a main slide valve in the main brake pipe chamber, a graduating valve in said chamber, means rigidly connecting said valves to the service piston and to the release and emergency piston, the main and graduating valves being formed with ports and passages to control the admission and release of brake cylinder pressure, a quick release chamber, a piston in said chamber and subject to the pressure therein, a quick release valve controlling an emergency reservoir port, means whereby an increase of brake pipe pressure will cause the piston to move and open the quick release valve, means affording communication between the emergency reservoir port and the brake pipe, a volume chamber, means whereby the main slide valve in service position will connect said volume chamber to an atmospheric port, a manually operable valve to open and close said port, and means whereby the main slide valve in release position will connect said volume chamber to the quick release chamber and to a restricted brake pipe port.

21. A triple valve for air brake apparatus comprising a main slide valve, means operating upon a reduction of brake pipe pressure to move said slide valve to application position and operating upon an increase in brake pipe pressure to move said slide valve to release position, a quick release chamber, a piston in said chamber and subject to the pressure therein, a quick release valve controlling an emergency reservoir port, means whereby an increase of brake pipe pressure will cause the piston to move toward the quick release chamber and open the quick release valve, means affording communication between the emergency reservoir port and the brake pipe, a volume chamber, means whereby the main slide valve in service position will connect said volume chamber to an atmospheric port, a manually operable valve to open and close said port, and means whereby the main slide valve in release position will connect the said volume chamber to the quick release chamber and to a restricted brake pipe port.

22. A triple valve for air brake apparatus comprising a main slide valve, means operating upon a reduction of brake pipe pressure to move said slide valve to application position and operating upon an increase in brake pipe pressure to move said slide valve to release position, a quick release chamber, a piston in said chamber and subject to the pressure therein, a quick release valve controlling an emergency reservoir port, means whereby an increase of brake pipe pressure will cause the piston to move toward the quick release chamber and open the quick release valve, means affording communication between the emergency reservoir port and the brake pipe, a volume chamber, means whereby the main slide valve in service position will connect said volume chamber to an atmospheric port, and means whereby the main slide valve in release position will connect said volume chamber to the quick release chamber and to a restricted brake pipe port.

23. A triple valve for air brake apparatus comprising a main slide valve, means operating upon a reduction of brake pipe pressure to move said slide valve to application position and operating upon an increase in brake pipe pressure to move said slide valve to release position, the main and graduating valves in service application position connecting a brake pipe port and a brake pipe reservoir port to the brake cylinder for a service application of the brakes, an emergency valve chamber, an emergency reservoir valve in said chamber, means whereby the said emergency reservoir valve will be opened when the main slide valve is in emergency position thereby to permit emergency reservoir air to flow into the emergency valve chamber, means affording communication between said emergency vent valve chamber and the brake cylinder when the main slide valve is in emergency position, an emergency vent valve chamber, an emergency vent valve therein, a quick release chamber, an emergency vent valve piston separating said chambers and subject to the pressure therein, means operatively connecting the emergency vent valve to the emergency vent valve piston, means affording communication between emergency vent valve chamber and the brake pipe, means whereby the emergency vent valve in emergency position will vent the brake pipe to atmosphere, and means whereby the main slide valve in emergency position will connect the emergency valve chamber to the quick release chamber.

24. A triple valve for air brake apparatus comprising a main slide valve, means operating upon a reduction of brake pipe pressure to move said slide valve to application position and operating upon an increase in brake pipe pressure to move said slide valve to release position, an emergency valve chamber, an emergency reservoir valve in said chamber, means whereby the said emergency reservoir valve will be opened when the main slide valve is in emergency position thereby to permit emergency reservoir air to flow into the emergency valve chamber, means affording communication between said emergency vent valve chamber and the brake cylinder when the main slide valve is in emergency position, an emergency vent valve chamber, an emergency vent valve therein, a quick release chamber, an emergency vent valve piston separating said chambers and subject to the pressure therein, means operatively connecting the emergency vent valve to the emergency vent valve piston, means affording communication between emergency vent valve chamber and the brake pipe, means whereby the emergency vent valve in emergency position will vent the brake pipe to atmosphere, and means whereby the main slide valve in emergency position will connect the emergency valve chamber to the quick release chamber.

25. A triple valve for air brake apparatus formed with a main brake pipe chamber provided with a brake pipe connection and having aligned cylindrical extensions of different diameters at its opposite ends, a service piston in the smaller extension of said chamber, a larger release and emergency piston in the larger extension of said chamber, a supplemental brake pipe chamber on the opposite side of the service piston from the main brake pipe chamber, an emergency valve chamber on the opposite side of the emergency and release piston from the main brake pipe chamber, a main slide valve in the main brake pipe chamber, a graduating valve in said chamber, means rigidly connecting said valves to the service piston and to the release and emergency piston, the main and graduating valves being formed with ports and passages to control the admission and release of brake cylinder pressure, an emergency vent valve chamber, an emergency vent valve therein, a quick release chamber, an emergency vent valve piston separating said chambers and subject to the pressures therein, means operatively connecting the emergency vent valve to the emergency vent valve piston, a quick release valve controlling communication between the emergency vent valve chamber and an emergency reservoir, means whereby an increase of pressure in the emergency vent valve chamber will cause the emergency vent valve piston to open the quick release valve, means affording communication between emergency vent valve chamber and the brake pipe, means whereby the emergency vent valve in emergency position will vent the brake pipe and the supplemental brake pipe chamber to atmosphere, and a pilot valve operating in response to a reduction in brake pipe pressure to vent the supplemental brake pipe chamber to the brake cylinder.

26. A triple valve for air brake apparatus formed with a main brake pipe chamber provided with a brake pipe connection and having aligned cylindrical extensions of different diameters at its opposite ends, a service piston in the smaller extension of said chamber, a larger release and emergency piston in the larger extension of said chamber, a supplemental brake pipe chamber on the opposite side of the service piston from the main brake pipe chamber, an emergency valve chamber on the opposite side of the emergency and release piston from the main brake pipe chamber, a main slide valve in the main brake pipe chamber, a graduating valve in said chamber, means rigidly connecting said valves to the service piston and to the release and emergency piston, the main and graduating valves in service application position connecting a brake pipe port and a brake pipe reservoir port to the brake cylinder for a service application of the brakes, a pilot valve operating upon a reduction of brake pipe pressure to vent the supplemental brake pipe chamber to the brake cylinder, an emergency reservoir valve, means whereby the emergency piston in emergency position will open said emergency reservoir valve and thereby permit the emergency reservoir air to flow into the emergency valve chamber, means affording communication between said emergency vent valve chamber and the brake cylinder when the main slide valve chamber is in emergency position, an emergency vent valve chamber, an emergency vent valve therein, a quick release chamber, an emergency vent valve piston separating said chambers and subject to the pressures therein, means operatively connecting the emergency vent valve to the emergency vent valve piston, means affording communication between emergency vent valve chamber and the brake pipe, and means whereby the emergency vent valve in emergency position will vent the brake pipe and the supplemental brake pipe chamber to atmosphere.

27. A triple valve for air brake apparatus comprising a main slide valve, means operating upon a reduction of brake pipe pressure to move said slide valve to application position and operating upon an increase in brake pipe pressure to move said slide valve to release position, the main and graduating valves in service application position connecting a brake pipe port and a brake pipe reservoir port to the brake cylinder for a service application of the brakes, an emergency valve chamber, an emergency reservoir valve in said chamber, means whereby the said emergency reservoir valve will be opened when the main slide valve is in emergency position thereby to permit emergency reservoir air to flow into the emergency valve chamber, means affording communication between said emergency vent valve chamber and the brake cylinder when the main slide valve is in emergency position, an emergency vent valve chamber, an emergency vent valve piston separating said chambers and subject to the pressure therein, means operatively connecting the emergency vent valve to the emergency vent valve piston, means affording communication between emergency vent valve chamber and the brake pipe, means whereby the emergency vent valve in emergency position will vent the brake pipe and the supplemental brake pipe chamber to atmosphere, an emergency lap spring to move the emergency vent valve to lap position to close the brake pipe vent port upon an equalization of pressure in the quick release chamber and the said vent valve chamber, and means whereby the main slide valve in emergency position will connect the emergency valve chamber to the quick release chamber and the emergency vent valve chamber to brake cylinder and close communication between the emergency vent valve chamber and the brake pipe.

28. A triple valve comprising a main slide valve, an emergency piston connected to said valve, an emergency vent valve, an emergency vent valve piston connected to said vent valve, and means operating upon a sudden reduction of brake pipe pressure for an emergency application of the brakes to move the emergency piston and the main slide valve to admit high pressure air to the brake cylinder and to the emergency vent valve piston thereby to move the vent valve into position to vent the brake pipe to atmosphere.

In testimony whereof I hereunto affix my signature.

SPENCER G. NEAL.